(12) United States Patent
Shibuya

(10) Patent No.: US 8,474,842 B2
(45) Date of Patent: Jul. 2, 2013

(54) VEHICLE STEERING APPARATUS AND SETTING APPARATUS THEREOF

(75) Inventor: Hiroshi Shibuya, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 289 days.

(21) Appl. No.: 13/000,703

(22) PCT Filed: Jun. 3, 2009

(86) PCT No.: PCT/JP2009/060187
§ 371 (c)(1),
(2), (4) Date: Dec. 22, 2010

(87) PCT Pub. No.: WO2010/140237
PCT Pub. Date: Dec. 9, 2010

(65) Prior Publication Data
US 2011/0101637 A1 May 5, 2011

(51) Int. Cl.
*B62D 7/16* (2006.01)
(52) U.S. Cl.
USPC .................. 280/93.51; 280/5.51; 280/93.512
(58) Field of Classification Search
USPC ........... 280/442, 93.512, 5.51, 86.75, 93.502, 280/93.51, 443, 124.11, 124.125, 124.126, 280/124.133, 124.135, 124.143, 124.15, 280/5.509
See application file for complete search history.

(56) References Cited

U.S. PATENT DOCUMENTS

| 2,223,274 | A | 11/1940 | Tait |
| 2,480,309 | A | 8/1949 | Tapp et al. |
| 2,516,074 | A | 7/1950 | Remde |
| 2,863,518 | A | 12/1958 | Pellizzetti |
| 3,229,992 | A | 1/1966 | Traywick |
| 3,587,767 | A | * 6/1971 | Gamaunt ............... 180/431 |
| 4,373,743 | A | 2/1983 | Parsons, Jr. |
| 4,546,997 | A | 10/1985 | Smyers |

(Continued)

FOREIGN PATENT DOCUMENTS

| CA | 2 526 958 | 5/2006 |
| DE | 2121262 A1 | 11/1972 |

(Continued)

OTHER PUBLICATIONS

Hiroshi Shibuya, Steering Device of Vehicle, Jan. 18, 2007, JPO, JP 2007-008285 A, English Abstract.*

(Continued)

*Primary Examiner* — Paul N Dickson
*Assistant Examiner* — James English
(74) *Attorney, Agent, or Firm* — Oblon, Spivak, McClelland, Maier & Neustadt, L.L.P.

(57) ABSTRACT

There are provided left and right arm mechanisms that connect an arm attachment portion as a part of a vehicle body to vehicle wheel attachment portions attached with front wheels via a front arm and a rear arm disposed in a front-rear direction of a vehicle and having plural links; and servo motors that independently drive the left and right arm mechanisms so that each link angle corresponding to a turning angle is determined. The setting position of the imaginary kingpin axis may be changed. Each link angle changes within a range of maintaining a correlation in which the turning angle increases in accordance with an increase in the steering operation amount when controlling the servo motors so as to obtain the turning angle corresponding to the steering operation amount of a steering wheel.

13 Claims, 15 Drawing Sheets

U.S. PATENT DOCUMENTS

| | | | |
|---|---|---|---|
| 4,632,413 A | 12/1986 | Fujita et al. | |
| 4,650,213 A | 3/1987 | Fujita et al. | |
| 4,779,880 A | 10/1988 | Hyodo | |
| 5,020,812 A | 6/1991 | Sugiyama | |
| 5,257,801 A | 11/1993 | Matsuzawa et al. | |
| 5,286,048 A * | 2/1994 | Tsuji et al. | 280/124.143 |
| 5,722,504 A | 3/1998 | Gaetani | |
| 6,142,494 A | 11/2000 | Higuchi | |
| 6,293,561 B1 * | 9/2001 | Goetzen et al. | 280/5.52 |
| 6,402,170 B1 | 6/2002 | Hurlburt | |
| 6,634,654 B2 * | 10/2003 | Mackle et al. | 280/5.521 |
| 7,389,998 B2 | 6/2008 | Kondo et al. | |
| 7,416,201 B2 | 8/2008 | Davey | |
| 7,467,802 B2 * | 12/2008 | Peng et al. | 280/124.103 |
| 7,562,884 B2 * | 7/2009 | Saibold et al. | 280/93.502 |
| 7,967,306 B2 * | 6/2011 | Mighell | 280/124.103 |
| 2007/0151780 A1 * | 7/2007 | Tonoli et al. | 180/65.1 |
| 2007/0187917 A1 | 8/2007 | Hasegawa et al. | |
| 2010/0219600 A1 | 9/2010 | Dada | |
| 2011/0101637 A1 | 5/2011 | Shibuya | |

FOREIGN PATENT DOCUMENTS

| | | |
|---|---|---|
| DE | 10 2004 055 282 A1 | 6/2006 |
| JP | 6-255527 | 9/1994 |
| JP | 6 312613 | 11/1994 |
| JP | 7-101216 | 4/1995 |
| JP | 9 507816 | 8/1997 |
| JP | 2002 532323 | 10/2002 |
| JP | 2004-168092 A | 6/2004 |
| JP | 2006 264510 | 10/2006 |
| JP | 2007 8285 | 1/2007 |
| JP | 2007 22468 | 2/2007 |
| JP | 2007 210497 | 8/2007 |
| JP | 2008 100668 | 5/2008 |
| JP | 2008-174056 | 7/2008 |
| WO | WO 2009/066160 A1 | 5/2009 |

OTHER PUBLICATIONS

Hiroshi Shibuya, Steering Device of Vehicle, Jan. 18, 2007, JPO, JP 2007-008285 A, Machine Translation of Description.*

International Search Report issued Aug. 25, 2009 in PCT/JP09/60187 filed Jun. 3, 2009.

Office Action mailed Jan. 3, 2012, in co-pending U.S. Appl. No. 12/674,098.

Office Action issued Jul. 13, 2011, in German Patent Application No. 11 2008 003 171.1 with English translation.

* cited by examiner

VEHICLE STEERING APPARATUS AND SETTING APPARATUS THEREOF

TECHNICAL FIELD

The present invention relates to an apparatus for steering a vehicle wheel of a vehicle and a setting apparatus thereof.

BACKGROUND ART

There has been known a steering apparatus capable of changing an imaginary kingpin axis by connecting a vehicle body and an one-side vehicle wheel attachment portion to each other using a pair of expansible front and rear arms and appropriately changing the lengths of the front and rear arms (for example, refer to Patent Document 1).

CITATION LIST

Patent Literature
   Patent Document 1: JP-A-2007-8285

SUMMARY OF INVENTION

Technical Field

In the above-described conventional steering apparatus, a large turning angle may not be obtained since the length of the arm is not sufficient when making a turn. Further, in the conventional steering apparatus, the turning angle of the vehicle wheel is correlated with a steering operation amount of a steering wheel operated by a driver. However, since it is not clear how to change the turning angle in accordance with a change of the steering operation amount when the steering operation amount changes, there is a concern that the steering feeling is not stable. Further, in the conventional steering apparatus, since the position of the imaginary kingpin axis is arbitrarily changed, it is not clear how to set the position of the imaginary kingpin axis.

Therefore, an object of the present invention is to provide a vehicle steering apparatus capable of ensuring a larger turning angle than that of the conventional device and a stable steering feeling, and a setting apparatus thereof.

Solutions Problem

Provided is a vehicle steering apparatus of the present invention including left and right arm mechanisms that connect a vehicle body to a vehicle wheel attachment portion attached with a vehicle wheel via front and rear arms disposed in a front-rear direction of a vehicle and having plural links rotatably connected to each other, an arm driving device which independently drives the left and right arm mechanisms so that each link angle corresponding to a turning angle of the vehicle wheel is determined, an imaginary kingpin axis setting device that is capable of changing a setting position of an imaginary kingpin axis as a center of the turning angle, and a turning angle control device that controls the arm driving device so that the turning angle corresponding to a steering operation amount of a steering member is obtained at the setting position of the imaginary kingpin axis, in which the turning angle control device controls the arm driving device so that each link angle changes within a range of maintaining a correlation in which the turning angle increases in accordance with an increase in the steering operation amount.

According to the vehicle steering apparatus, the required turning angle having a center of the position of the arbitrarily set imaginary kingpin axis may be given to the vehicle wheel in such a manner that each arm mechanism is driven by the arm driving device to variously change each link angle. Since each of the front and rear arms has a configuration in which the plural links are rotatably connected to each other, the distance between the vehicle body and the vehicle wheel attachment portion may be adjusted within a large range compared with the case where each of the front and rear arms is formed as a single link. For this reason, the turning angle larger than that of the conventional art may be given to the vehicle wheel. Since the turning angle given to the vehicle wheel changes within a range of maintaining a correlation in which the turning angle increases in accordance with an increase in the steering operation amount of the steering member, the steering feeling is stable.

The correlation between the steering operation amount and the turning angle may be non-linearly set as long as one of them increases in accordance with an increase of the other. Further, the correlation may be set to include a region in which the turning angle increases in proportion to an increase in the steering operation amount. In this aspect, since a region is provided in which the steering operation amount is proportional to the turning angle, the operation of the steering member naturally corresponds to the movement of the vehicle in this region, thereby obtaining a satisfactory steering feeling.

In an aspect of the vehicle steering apparatus of the invention, a different correlation may be set to each setting position so that a degree of an increase in the turning angle with respect to an increase in the steering operation amount changes before and after changing the setting position of the imaginary kingpin axis. The magnitude of the lateral force of the vehicle wheel generated with respect to the same turning angle changes as the position of the imaginary kingpin axis changes. For this reason, when the correlation between the steering operation amount and the turning angle is fixed to one case, there is a concern that a variation in the steering feeling increases before and after changing the setting position of the imaginary kingpin axis. According to this aspect, since the different correlation between the steering operation amount and the turning angle is provided for each position of the imaginary kingpin axis, a variation in the steering feeling may be suppressed before and after changing the setting position. Accordingly, the stability of the steering feeling is improved.

In an aspect of the vehicle steering apparatus of the invention, the steering apparatus may further include a change command device that commands the imaginary kingpin axis setting device to change the setting position of the imaginary kingpin axis, and a change prohibition device that prohibits the change of the setting position by the imaginary kingpin axis setting device when a command is sent from the change command device during a steering operation at the given turning angle. According to this aspect, the position of the imaginary kingpin axis is prohibited from being changed during the steering operation. That is, even when the change of the setting position of the imaginary kingpin axis is commanded during the steering operation, the position of the imaginary kingpin axis is maintained in the state before the change. Accordingly, unexpected movement of the vehicle may be prevented during the steering operation.

The change prohibition of the setting position of the imaginary kingpin axis may be canceled at an appropriate timing other than the steering state. For example, the change prohibition device may cancel the setting position change prohibition with respect to the imaginary kingpin axis setting device when returning from the steering operation to a neutral position of the steering member moving the vehicle forward. In this case, since the change prohibition is canceled and the setting position of the imaginary kingpin axis is changed in response to the return to the neutral position of the steering member, the steering operation may be performed at the positions of the different imaginary kingpin axes between front and rear corners in a continuous corner such as an S-shaped corner having a flexion point. In such a continuous corner, even when a lateral acceleration remains upon clearing the front corner, the steering may be compulsorily performed in the opposite direction toward the rear corner. However, in this case, it is effective in that the setting position of the imaginary kingpin axis may be changed to the appropriate position in the rear corner.

It is advantageous to prohibit the change of the setting position of the imaginary kingpin axis during the steering operation in that the vehicle movement is stable during the steering operation. However, in a corner such as a spoon corner where the steering direction is the same and further turning or returning the steering wheel is needed, the setting position of the imaginary kingpin axis may be changed at the time of further turning or returning the steering wheel or the movement of the vehicle may be changed during the steering operation, which may be advantageous in the steering operation in some times. In order to handle this case, the vehicle steering apparatus may further include a compulsory canceling device that compulsorily cancels the setting position change prohibition by the change prohibition device during the steering operation. In this case, the setting position change prohibition of the imaginary kingpin axis may be canceled during the steering operation by the compulsory canceling device. Accordingly, when the compulsory canceling device is provided, since the above-described demand may be handled, the convenience of the steering apparatus may be improved. As a condition of compulsorily canceling the setting position change prohibition, for example, an operation device such as an input button mounted on the vehicle may be operated by the user.

In an aspect of the steering apparatus of the invention, the vehicle steering apparatus may further include a change delay time setting device that sets a delay time, delaying the change of the setting position of the imaginary kingpin axis, to become longer as an operation speed of the steering member becomes faster during the steering operation at the given turning angle. When the setting position of the imaginary kingpin axis is suddenly changed during the steering operation, unexpected movement may easily occur. According to this aspect, since the delay time becomes longer as the operation speed of the steering member becomes faster, the change of the vehicle movement when changing the setting position of the imaginary kingpin axis during the steering operation may be alleviated.

In an aspect of the vehicle steering apparatus of the invention, the vehicle steering apparatus may further include a geometry setting device that is capable of changing at least one of a tread and a toe angle by changing each link angle, and a change delay time setting device that sets a delay time, delaying the change of the tread and the toe angle of the geometry setting device, to become longer as an operation speed of the steering member becomes faster during the steering operation at the given turning angle. In a continuous corner such as an S-shaped corner, the cornering performance may be improved by changing geometry such as a tread or a toe angle for each corner. For example, when the tread is changed during the steering operation so that the turning outer wheel is located on the outside, the rolling reduces, and hence the ground contact load of the vehicle wheel reduces. For this reason, the cornering speed may become faster than the case where the tread is uniformly maintained. However, when the geometry such as a tread or a toe angle is suddenly changed during the steering operation, unexpected movement may easily occur. According to this aspect, since the time of changing the geometry becomes longer as the operation speed of the steering member becomes faster, the sudden change of the geometry may be prevented, thereby alleviating a variation in the movement in accordance with the change of the geometry during the steering operation.

In an aspect of the vehicle steering apparatus of the invention, the vehicle steering apparatus may further include a display device that is provided to be visible to a user of the vehicle and visually displays thereon plural positions that may be set as the setting position of the imaginary kingpin axis, a display control device that movably displays an indication device, selectively indicating any one of the plural positions, on the display device, an input device that receives a user's predetermined operation correlating an indication position of the indication device with any one of the plural positions, and a setting control device that makes the imaginary kingpin axis setting device set a position corresponding to the predetermined operation as the setting position of the imaginary kingpin axis when the input device receives the predetermined operation. According to this aspect, the change or setting of the position of the imaginary kingpin axis may be visually operated by a user (a driver or a fellow passenger). For this reason, since the operation is intuitively performed by the user, it is advantageous in that the position of the imaginary kingpin axis is easily set. As the display device, a display such as a liquid crystal display used in a navigation system mounted on the vehicle may be used, and the display device may be independently provided to set the imaginary kingpin axis. Further, the input device may be realized by a touch panel type device that receives a user's touch operation contacting the display device, and the input device may be realized by a device that is capable of receiving an operation of an operation portion such as a switch provided separately from the display device.

In this aspect, the position of any one of left and right vehicle wheels may be displayed as the plural positions on the display device, and the setting control device may make the imaginary kingpin axis setting device set the position corresponding to the predetermined operation as the setting position of the imaginary kingpin axis for each of the left and right vehicle wheels when the input device receives the predetermined operation. In this case, since the setting position of the imaginary kingpin axis for the left and right vehicle wheels may be set by performing a predetermined operation on one-side vehicle wheel, the inconvenience of the operation may be alleviated compared with the case where the same operation needs to be performed on the left and right vehicle wheels by the user.

In an aspect of the vehicle steering apparatus of the invention, in the front and rear arms, one end portions may be rotatably connected to the vehicle wheel attachment portion at a pair of vehicle wheel side connection points distant from each other in the front-rear direction of the vehicle, and the respective other end portions maybe rotatably connected to the vehicle body at a pair of vehicle body side connection points distant from each other in the front-rear direction, and the plural links may be rotatably connected to each other at a middle connection point. According to this aspect, the distance between the vehicle body side connection point and the vehicle wheel side connection point may be adjusted within a large range compared with the case where each of the front and rear arms is formed as a single link. Accordingly, the turning angle larger than that of the conventional art may be given to the vehicle wheel.

In this aspect, the arm driving device includes link driving devices attached to connection points as many as the total number of the vehicle body side connection point, the middle connection point, and the vehicle wheel side connection point, and can determine the link angle by rotationally driving the link about the corresponding connection point using each link driving device. A servo motor may be used as the link driving device. Further, even when the link driving devices are not provided at all connection points, the positions of the connection points without the link driving devices may be definitely determined by determining the angles of the links rotating about several connection points.

For example, the arm driving device may include link driving devices attached to connection points provided as many as the number obtained by subtracting three from a total number of the vehicle body side connection point, the middle connection point, and the vehicle wheel side connection point in each arm mechanism, and each link driving device may determine the link angle by rotationally driving the link about the corresponding connection point. In the invention, since each of the front and rear arms includes at least two links, each arm mechanism is formed as a link mechanism having six connection points of a pair of vehicle body side connection points, a pair of vehicle wheel side connection points, and a pair of middle connection points. Since the vehicle wheel side connection points may be regarded as one link, and the vehicle body side connection points may be regarded as one link fixed to the vehicle body, when the angles of the links about the connection points provided as many as the number obtained by subtracting three from the total number of the connection points are determined, the positions of the other three connection points are definitely determined. That is, when the angles of the links are determined by the link driving devices, the angles of the links rotating about the other three connection points are definitely determined, and hence the positions of the connection points do not need to be actively controlled. Accordingly, the number of the link driving devices required to operate the arm mechanisms may be set to be minimal, the device may be decreased in size, and the control may be facilitated.

Provided is a setting apparatus that is applied to a vehicle steering apparatus capable of changing a setting position of an imaginary kingpin axis as a center of a turning angle of a vehicle wheel, the setting apparatus including a display device that visually displays plural positions that may be set as the setting position of the imaginary kingpin axis, a display control device that movably displays an indication device, selectively indicating any one of the plural positions, on the display device, an input device that receives a user's predetermined operation correlating an indication position of the indication device with any one of the plural positions, and a setting control device that outputs a setting command signal for making the steering apparatus set a position corresponding to the predetermined operation as the setting position of the imaginary kingpin axis when the input device receives the predetermined operation.

According to the setting apparatus, the change or setting of the position of the imaginary kingpin axis may be visually operated by the user. For this reason, since the operation is intuitively performed by the user, it is advantageous in that the position of the imaginary kingpin axis is easily set. The setting apparatus may be realized by an in-vehicle device mounted on the vehicle. The setting apparatus may be realized by a setting apparatus distinguished from an in-vehicle device such as a personal computer provided separately from the vehicle or a remote device that can be remotely operated. The input device may be realized by a touch panel type device that receives a user's touch operation contacting the display device, and the input device may be realized by a device that is capable of receiving an operation of an operation portion such as a switch provided separately from the display device.

In an aspect of the setting apparatus of the invention, the position of any one of left and right vehicle wheels may be displayed as the plural positions on the display device, and the setting control device may output a signal as the setting command signal for making the steering apparatus set the position corresponding to the predetermined operation as the setting position of the imaginary kingpin axis for each of the left and right vehicle wheels when the input device receives the predetermined operation. In this case, since the setting position of the imaginary kingpin axis for the left and right vehicle wheels may be set in the steering apparatus by a user performing a predetermined operation on one-side vehicle wheel, the inconvenience of the operation may be alleviated compared with the case where the same operation needs to be performed on the left and right vehicle wheels by the user.

DESCRIPTION OF EMBODIMENTS (First Embodiment)

Figure 1:
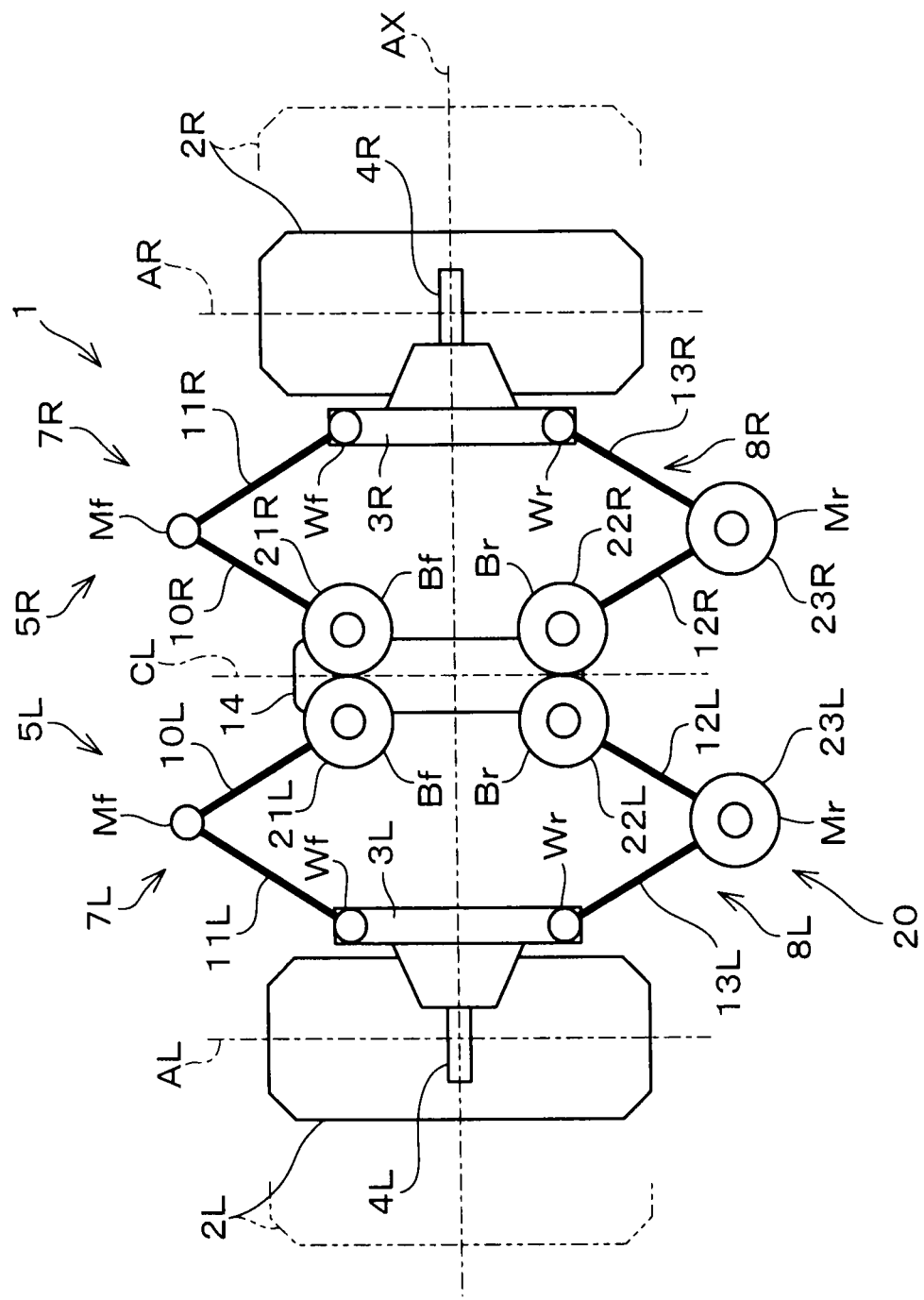
FIG. 1 is a diagram illustrating a state of a steering apparatus according to an embodiment of the invention when a vehicle moves forward.

FIG. 1 is a diagram illustrating a state of a steering apparatus of an embodiment of the invention when a vehicle moves forward. Further, in the accompanying drawings, the left and right sides are distinguished from each other by attaching subscripts L and R to the reference numerals respectively representing the components. However, in the following description, the subscripts may be omitted when the left and right sides do not need to be particularly distinguished from each other. A steering apparatus 1 of FIG. 1 is used to steer front wheels 2L and 2R on the left and right sides of an automobile. The front wheels 2L and 2R as the vehicle wheels are respectively attached to vehicle wheel attachment portions 3L and 3R. The vehicle wheel attachment portions 3L and 3R are configured as assembly components that include spindles 4L and 4R serving as rotation centers of the front wheels 2L and 2R. Alternatively, the vehicle wheel attachment portion 3 may be configured as an in-wheel motor, in which case the output shaft of the in-wheel motor constitutes the spindle 4.

The steering apparatus 1 includes left and right arm mechanisms 5L and 5R which are provided to respectively correspond to the left and right vehicle wheel attachment portions 3. The arm mechanisms 5L and 5R are symmetrically formed with a front-rear direction central line CL of the vehicle interposed therebetween. The left arm mechanism 5L includes a pair of arms having a front arm 7L and a rear arm 8L arranged in the front-rear direction (the vertical direction of FIG. 1) of the vehicle. The front arm 7L has a configuration in which respective one ends of two inner and outer links 10L and 11L are rotatably connected to each other at a middle connection point Mf, and the rear arm 8L has a configuration in which respective one ends of two inner and outer links 12L and 13L are rotatably connected to each other at a middle connection point Mr. The respective other ends of the inner links 10L and 12L are rotatably connected to a pair of vehicle body side connection points Bf and Br that are distant from each other in the front-rear direction in an arm attachment portion 14 as a part of the vehicle body. The respective other ends of the outer links 11L and 13L are rotatably connected to a pair of vehicle wheel side connection points Wf and Wr that are distant from each other in the front-rear direction in the vehicle wheel attachment portion 3L. That is, the front arm 7L and the rear arm 8L have a configuration in which the plural links 10L and 11L or 12L and 13L are connected to each other in series from the vehicle body side connection points Bf and Br to the vehicle wheel side connection points Wf and Wr via the middle connection points Mf and Mr. The front arm 7L and the rear arm 8L are formed to be front-rear symmetrical to each other with respect to an axle central line AX. The axle central line AX is a line existing in the width direction of the vehicle and connecting the spindles 4L and 4R when the front wheels 2L and 2R move forward.

In the same way, the right arm mechanism 5R includes a pair of arms having a front arm 7R and a rear arm 8R arranged in the front-rear direction of the vehicle. The front arm 7R has a configuration in which respective one ends of two inner and outer links 10R and 11R are rotatably connected to each other at a middle connection point Mf, and the rear arm 8R has a configuration in which respective one ends of two inner and outer links 12R and 13R are rotatably connected to each other at a middle connection point Mr. The respective other ends of the inner links 10R and 12R are rotatably connected to a pair of vehicle body side connection points Bf and Br that are distant from each other in the front-rear direction in the arm attachment portion 14 as a part of the vehicle body. The respective other ends of the outer links 11R and 13R are rotatably connected to a pair of vehicle wheel side connection points Wf and Wr that are distant from each other in the front-rear direction in the vehicle wheel attachment portion 3R. That is, the front arm 7R and the rear arm 8R have a configuration in which the plural links 10R and 11R or 12R and 13R are connected to each other in series from the vehicle body side connection points Bf and Br to the vehicle wheel side connection points Wf and Wr via the middle connection points Mf and Mr. The front arm 7R and the rear arm 8R are formed to be front-rear symmetrical to each other with respect to the axle central line AX.

As obviously understood from the above description, each arm mechanism 5 includes six link components, that is, a six-joint link mechanism in which a vehicle wheel attachment portion 33, the links 10 to 13, and the arm attachment portion 14 are rotatably connected to each other via six connection points Bf, Mf, Wf, Wr, Mr, and Br. The steering apparatus 1 includes an arm driving unit 20 that serves as the arm driving device for independently driving the arm mechanisms 5L and 5R. The arm driving unit 20 includes a first servomotor 21, a second servomotor 22, and a third servomotor 23 which are respectively provided for each arm mechanism 5 and serve as the link driving devices that rotationally drive the links 10, 12, and 13 so as to define their angles. The first servomotor 21 rotationally drives the inner link 10 about the connection point Bf relative to the arm attachment portion 14, and the second servo motor 22 rotationally drives the inner link 12 about the connection point Br relative to the arm attachment portion 14. Then, the third servomotor 23 rotationally drives the outer link 13 about the connection point Mr relative to the inner link 12 of the rear arm 8. Since the angles of the links 10, 12, and 13 are definitely defined by the servo motors 21 to 23, the positions of the five connection points Bf, Br, Mf, Mr, and Wr are definitely determined, and as a result, the final one position of the connection point Wf is definitely determined. That is, in each arm mechanism 5, the position of the imaginary kingpin axis of the front wheel 2 and the inclination (the turning angle of the front wheel 2) of the vehicle wheel attachment portion 3 with respect to the front-rear direction central line CL may be definitely determined by adjusting the angles of the links 10, 12, and 13 through the servo motors 21 to 23.

The front wheels 2L and 2R move forward while the links 10 to 13 of each arm mechanism 5 are folded as small as possible by the servo motors 21 to 23. In this forward movement state, the arms 10 to 13 of the arm mechanisms 5L and 5R are bilaterally symmetrical to each other, and the vehicle wheel side connection points Wf and Wr of each arm mechanism 5 are arranged in a line in the front-rear direction. The distances from the front-rear direction central line CL of the vehicle to central lines AL and AR of the front wheels 2L and 2R are equal to each other.

Figure 2:
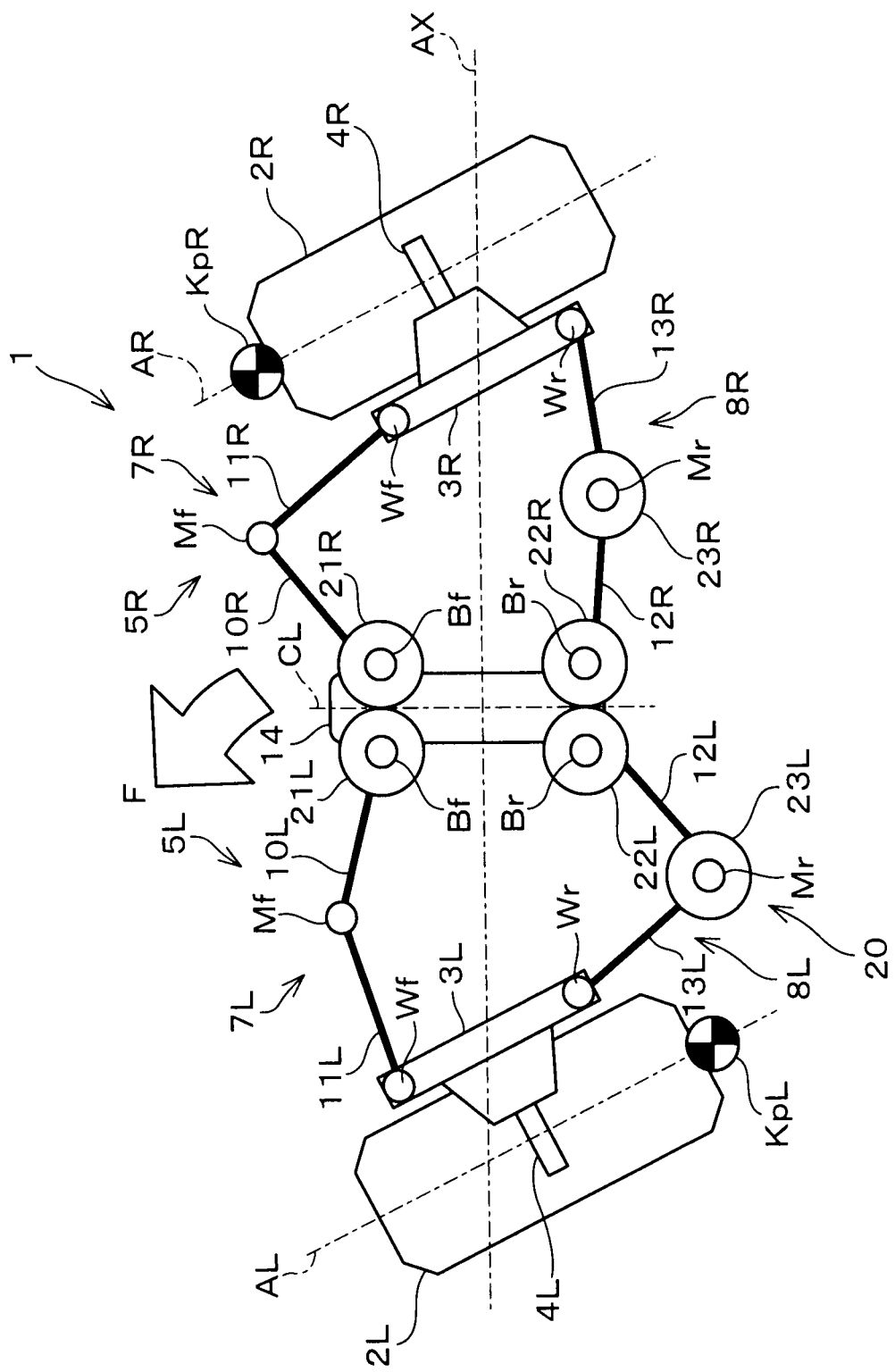
FIG. 2 is a diagram illustrating a shape when making a left turn while imaginary kingpin axes are respectively set to front and rear ends of a front wheel.

FIG. 2 illustrates an exemplary state of the steering apparatus 1 when making a left turn. In this example, the left front wheel 2L is steered about an imaginary kingpin axis KpL set on the rear end thereof and the central line AL, and the right front wheel 2R is steered about an imaginary kingpin axis KpR set on the front end thereof and the central line AR. The servo motors 21 to 23 are operated as follows from the forward movement state of FIG. 1 to the steering state of FIG. 2. First, as for the left arm mechanism 5L, the first servo motor 21L is driven so as to rotate the link 10L about the connection point Bf in the counter-clockwise direction, the second servo motor 22L is driven so as to rotate the link 12L about the connection point Br in the clockwise direction, and the third servo motor 23L is driven so as to rotate the link 13L in the counter-clockwise direction until the length (the distance between the connection points Bf and Wf) of the front arm 7L becomes approximately maximal. On the other hand, as for the right arm mechanism 5R, the first servo motor 21R is driven so as to rotate the link 1OR about the connection point Bf in the counter-clockwise direction, the second servo motor 22R is driven so as to rotate the link 12R about the connection point Br in the clockwise direction, and the third servo motor 23R is driven so as to rotate the link 13R in the clockwise direction until the length (the distance between the connection points Bf and Wf) of the rear arm 8R becomes approximately maximal.

Figure 3:
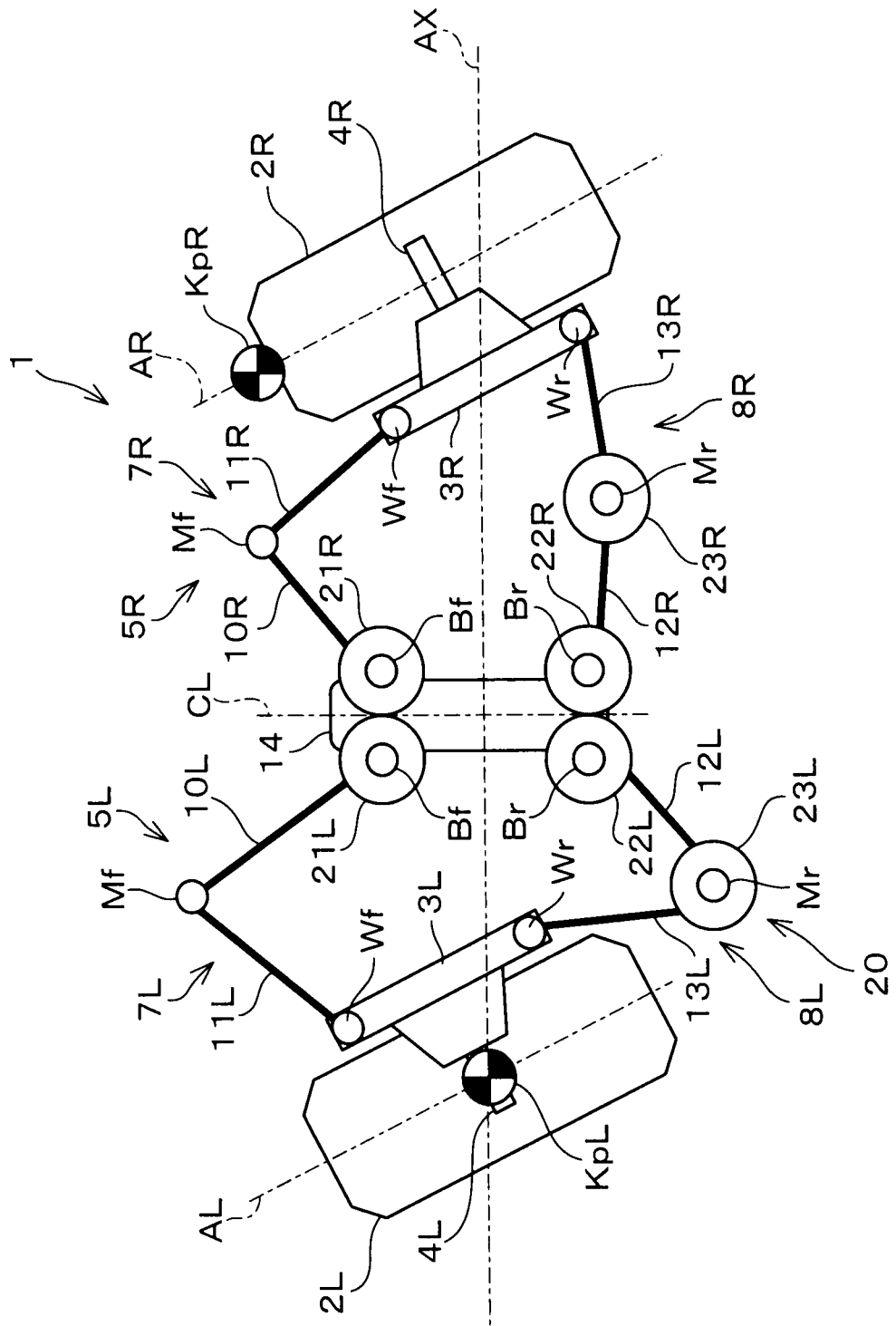
FIG. 3 is a diagram illustrating a shape when making a left turn while the imaginary kingpin axis of the turning inner wheel is set to the center of the front wheel and the imaginary kingpin axis of the turning outer wheel is set to the front end of the front wheel.

FIG. 2 is an example of steering the front wheel 2, and according to the steering apparatus 1 of the embodiment, the imaginary kingpin axis Kp may be set to an arbitrary position as well as the front and rear ends of the front wheel 2 by appropriately driving the servo motors 21 to 23 of each arm mechanism 5. For example, as shown in FIG. 3, when the imaginary kingpin axis KpL is set to the center of the ground contact surface of the left front wheel 2L as a turning inner wheel, the front wheel 2L may be steered thereabout. On the other hand, when the imaginary kingpin axis KpR is set to the same position of FIG. 2 of the right front wheel 2R as a turning outer wheel, the front wheel 2R may be steered thereabout. Therefore, according to the steering apparatus 1 of the embodiment, the imaginary kingpin axis Kp may be set to the optimal position in accordance with a loading amount on the vehicle, a front-rear weight distribution, a vehicle speed, a road surface condition, and the like. In the setting of the imaginary kingpin axis Kp, for example, when a large turning angle is needed, the imaginary kingpin axis Kp may be set as shown in FIG. 2. Alternatively, when the steering torque of the front wheel 2 increases as in the parking steering in the parking lot, the steering torque may be suppressed to be minimal by setting the imaginary kingpin axis Kp to the substantially center of the ground contact surface of the front wheel 2 as in the left front wheel 2L of FIG. 3.

As is obviously understood from the example of FIG. 3, since the left and right arm mechanisms 5L and 5R of the embodiment may be independently driven, the ackerman ratio may be adjusted. The ackerman ratio indicates a ratio between left and right turning angles when making a turn. Alternatively, when the steering apparatus 1 of the embodiment is applied to the front and rear wheels, the four wheel steering function may be easily realized.

In the steering apparatus 1 of the embodiment, the tread of the front wheels 2L and 2R may be changed. That is, when the vehicle wheel side connection points Wf and Wr are equal to each other, and are displaced along the axle central line AX by driving the servo motors 21 to 23, the tread is enlarged as depicted by the imaginary line of FIG. 1 without changing the turning angle of the front wheel 2, or the enlarged tread maybe contracted again. Accordingly, the tread may be changed in accordance with the travel situation by, for example, setting the tread to be small in the ordinary road or urban district and enlarging the tread in the highway so as to improve the stability of the vehicle. Further, in the steering apparatus 1, the toe angles of the front wheels 2L and 2R defined at the neutral position moving the vehicle forward may be changed. Although the state shown in FIG. 1 indicates a state where the toe angle is 0, when the servo motors 21 to 23 are driven so that the vehicle wheel side connection points Wf and Wr are inclined in a bilaterally symmetrical manner with respect to the front-rear direction central line CL, the toe angle may be changed to the toe-in or toe-out state. When the toe angle becomes large toward the toe-in side during a forward movement, the steering apparatus 1 may serve as a brake device that decreases the vehicle speed.

In the connection points Bf, Br, Mf, Mr, Wf, and Wr of the links 10 to 13, the connection structure may be determined so that the arms 7 and 8 may rotate about the vertical axis line of the vehicle. However, when the connection points are connected via a bush, a spherical bearing, or the like, the arms 7 and 8 may slightly rotate about the horizontal axis line relative to the vehicle wheel attachment portion 3 or the arm attachment portion 14. The vertical movement of the front wheels 2L and 2R relative to the vehicle body may be permitted in such a manner that the arms 7 and 8 are adapted to be displaceable relative to the vehicle wheel attachment portion 3 or the arm attachment portion 14. In this case, the arm mechanism 5 may serve as a suspension by installing a spring and an attenuation device between the vehicle body and the arms 7 and 8. However, the front wheel 2 may be supported by a suspension mechanism installed separately from the steering apparatus 1, and the steering apparatus 1 may be only in charge of steering and driving the front wheel 2.

Figure 4:
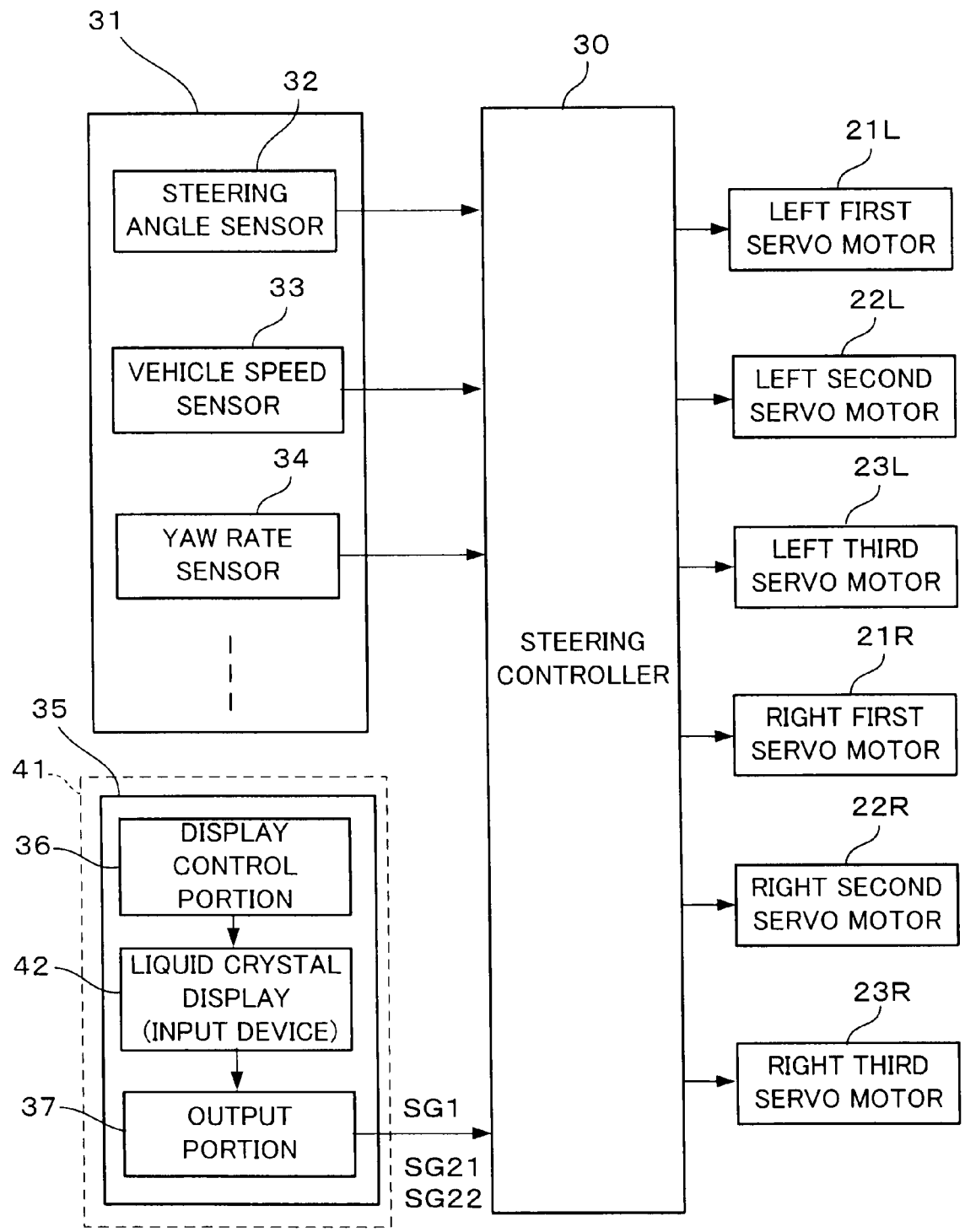
FIG. 4 is a block diagram illustrating a schematic configuration of a control system of the steering apparatus according to a first embodiment.

Next, a control system will be described which is installed in the steering apparatus 1 so as to operate the arms 7 and 8 in accordance with the operation of a steering wheel SH (refer to FIG. 5) as the steering member mounted on the vehicle. FIG. 4 is a block diagram illustrating the control system thereof. The control system of the steering apparatus 1 includes a steering controller (hereinafter, simply referred to as a controller) 30 as the turning angle control device for controlling the operation of the servo motors 21 to 23 in accordance with the operation of the steering wheel SH. The controller 30 is configured as a computer unit. The above-described left and right servo motors 21 to 23 as controlled objects are connected to the controller 30. A state detecting device 31 for detecting various states to be referred in the control of the servomotors 21 to 23 is connected to the controller 30. The state detecting device 31 includes a steering angle sensor 32 which is capable of detecting an operation angle (steering operation amount) from the neutral position (the position in the forward movement state) of the steering wheel SH and the operation speed thereof. In addition, the steering operation amount mentioned herein includes information capable of identifying the operation direction from the neutral position of the steering wheel SH. Further, the state detecting device 31 may include various sensors such as a vehicle speed sensor 33 and a yaw rate sensor 34, which are used to detect parameters (hereinafter, referred to as vehicle movement parameters) representing the movement state of the vehicle. As the vehicle movement parameters to be referred, a vehicle body slip angle, a lateral acceleration, and the like may be appropriately selected in addition to a vehicle speed and a yaw rate. Further, the state detecting device 31 may include a sensor for detecting a load of front and rear wheel shafts of the vehicle, or a sensor for detecting a road surface condition.

Figure 5:
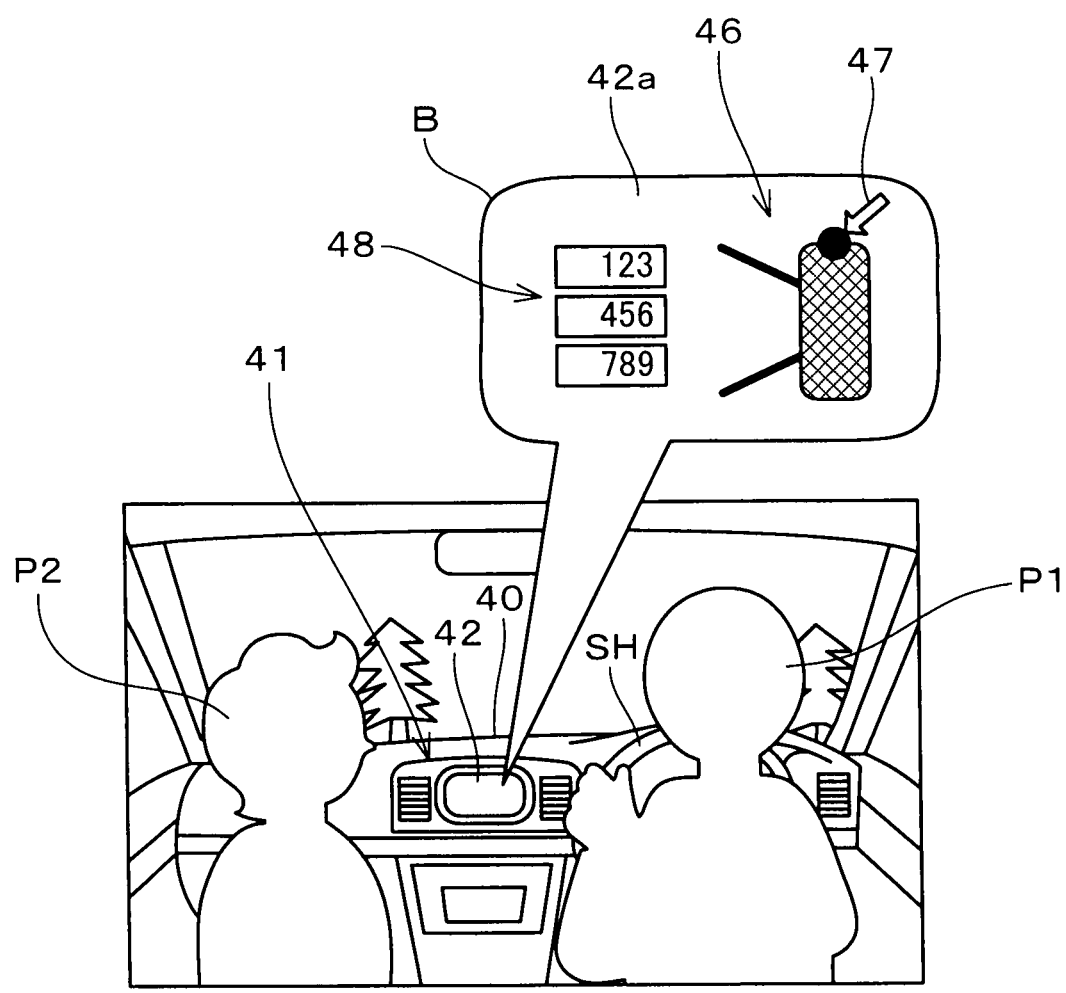
FIG. 5 is a diagram illustrating an appearance of an information input device.

Further, an information input device 35 for setting and changing the position of the imaginary kingpin axis, the tread, and the toe angle by an external input is connected to the controller 30. FIG. 5 is a diagram illustrating an appearance of the information input device 35. The information input device 35 is assembled to an in-vehicle device 41 that is mounted on a dashboard 40 of the vehicle. The in-vehicle device 41 is a known device that includes various systems such as a navigation system and an audio system. In the in-vehicle device 41, a liquid crystal display 42 as the display device for informing a user of information used in various systems while displaying the information thereon is installed so as to be recognizable by a user such as a driver P1 and a fellow passenger P2. As is widely known, the display contents of the liquid crystal display 42 are appropriately changed for each system performed by the in-vehicle device 41.

The part B of FIG. 5 illustrates an example of the display contents of the liquid crystal display 42 when the information input device 35 functions on the in-vehicle device 41. An image 46 depicting the peripheral structure including the right front wheel and the front and rear arms is displayed on the liquid crystal display 42, and a pointer 47 as the indication device for indicating the position of the imaginary kingpin axis which may be set is displayed on the image 46 in an overlapping manner. A touch panel type input device is provided on a screen 42a of the liquid crystal display 42, and when the user touches the screen 42a of the liquid crystal display 42, the pointer 47 moves on the screen 42a. The movement control of the pointer 47 is performed by a display control portion 36 as the display control device provided in the information input device 35 shown in FIG. 4, and the display control portion 36 controls the display of the pointer 47 based on information of the input device.

When the pointer 47 moves to a position where the imaginary kingpin axis may be set, the position is reversely displayed as shown in the part B of FIG. 5, and the indication position of the pointer 47 is highlighted. As the reversely displaying position, there are plural positions corresponding to the plural positions where the imaginary kingpin axis may be set. When the user lightly hits (taps) the screen 42a while one indication position as a setting candidate is reversely displayed, the position is confirmed as the setting position of the imaginary kingpin axis. The confirmation information is temporarily stored in an output portion 37 as the setting control device provided in the information input device 35, and the stored confirmation information is subjected to various processes in the output portion 37, thereby outputting the information as a setting command signal SG1. The setting command signal SG1 is input to the controller 30 of FIG. 4.

In accordance with a series of operations in which the user touches and taps the screen 42a of the liquid crystal display 42, any one of plural positions where the imaginary kingpin axis may be set is correlated to the position indicated by the pointer 47. Accordingly, the series of operations performed by the user correspond to the predetermined operations according to the invention. In this manner, since the position of the imaginary kingpin axis is changed or set by the user's visual operation through the information input device 35 of the embodiment, the operation is intuitively performed by the user, thereby easily setting the position of the imaginary kingpin axis.

When the setting command signal SG1 is input, the controller 30 performs the setting process to be described later so that the position of the imaginary kingpin axis becomes the position in accordance with the setting command signal SG1. In this manner, the information input device 35 commands the controller 30 to change the setting position of the imaginary kingpin axis by using the setting command signal SG1, and the controller 30 may change the position of the imaginary kingpin axis based on the setting command signal SG1. For this reason, the information input device 35 serves as the change command device according to the invention. Further, in the setting process, when the right setting position is commanded, the left setting position as the opposite side of the right setting position is simultaneously set. That is, the setting command signal SG1 output from the output unit 37 is setting information of one of left and right sides, and has a function capable of setting the positions of both left and right imaginary kingpin axes by using the controller 30. Accordingly, since the same operation for the left and right sides is not requested to be performed by the user, the trouble of the operation is alleviated.

Even in the setting and changing of geometry such as a tread or a toe angle, the information input device 35 is configured to send the tread and toe angle setting commands to the controller 30 by operating the screen 42a of the liquid crystal display 42 as described above. As shown in the part B of FIG. 5, plural button images 48 corresponding to plural modes in which the setting values of the tread and the toe angle are set in advance are displayed on the screen 42a. The mode to be set is confirmed by tapping the screen 42a while moving the pointer 47 on the screen 42a and being overlapped with any one of the button images 48. As plural modes prepared in advance in the information input device 35, there are a standard tread mode for setting the tread to a standard value, a large tread mode for setting the tread to a value larger than the standard value, a small tread mode for setting the tread to a value smaller than the standard value, a toe angle 0 mode for setting the toe angle to 0, a small toe-in mode for setting the toe-in to a small value, a large toe-in mode for setting the toe-in to a large value, and the like. In addition, although the detailed description will be omitted, the information input device 35 may perform the input of detailed numerals for the tread and the toe angle on the screen 42a in addition to the mode selection. When the mode to be set is confirmed from these modes in accordance with the above-described user's operation, the confirmation information is temporarily stored in the output unit 37. The stored confirmation information is subjected to various processes in the output unit 37, is output as setting command signals SG21 and SG22, and then is input to the controller 30. The setting command signal SG21 includes information on the tread corresponding to the selected mode, and the setting command signal SG22 includes information on the toe angle corresponding to the selected mode.

Further, in the embodiment, the information input device 35 is assembled to the in-vehicle device 41, but the same function as that of the information input device 35 may be realized by an external input device such as a personal computer or a remote device which may be remotely operated and provided separately from the in-vehicle device 41. In the embodiment, the information input device 35 serves as the setting apparatus of the invention. In addition, the input device is not limited to the touch panel type, but the input device may be realized by an device capable of receiving a voice input or an device capable of receiving an operation from an operation device such as a keyboard or a button provided separately from the display device such as the liquid crystal display 42.

Figure 6:
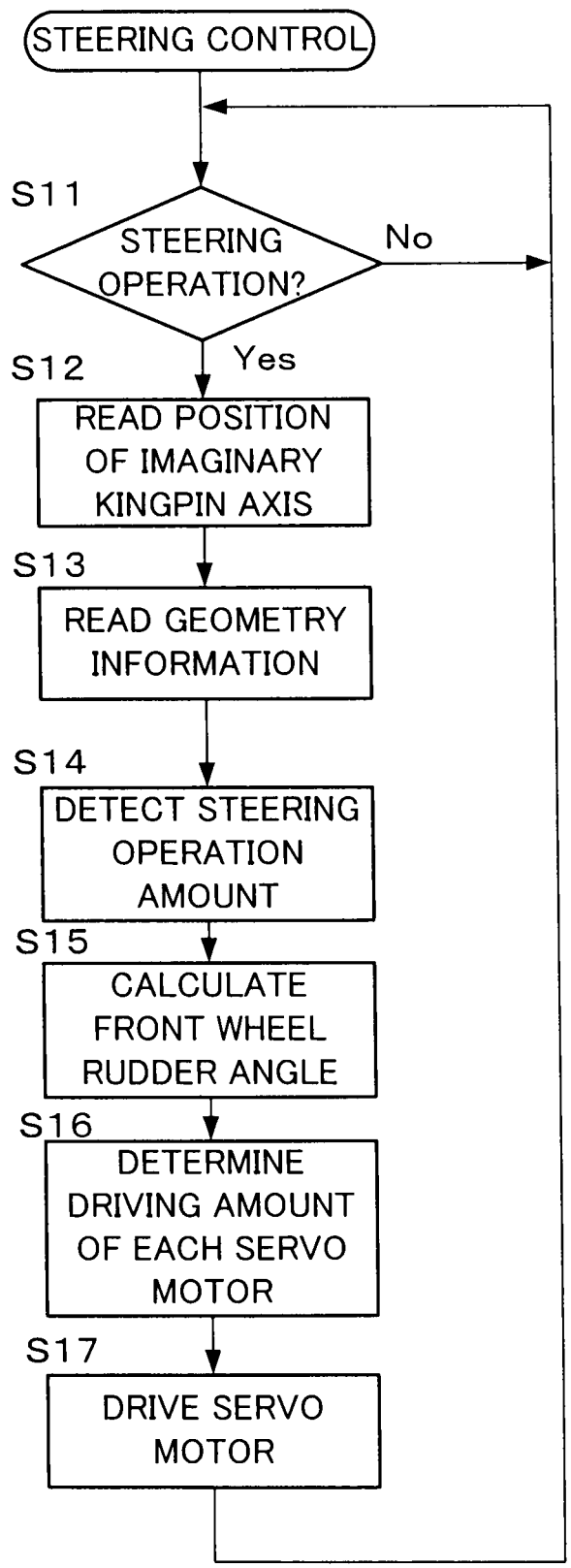
FIG. 6 is a flowchart illustrating a steering control routine performed by a steering controller of FIG. 4.

FIG. 6 is a flowchart illustrating a steering control routine performed by the controller 30 in order to steer the front wheel 2. In this routine, first in step S11, it is determined whether the steering wheel SH is operated based on the output signal from the steering angle sensor 32. The process is put on hold when there is no steering operation, and the process of subsequent step S12 is performed when there is a steering operation. In step S12, the position of the imaginary kingpin axis set in the imaginary kingpin position setting routine to be described later is read. In subsequent step S13, the geometry information including at least one of the tread and the toe angle respectively set in the tread setting routine and the toe angle setting routine to be described later is read.

After the position of the imaginary kingpin axis and the geometry information are read in steps S12 and S13, the steering operation amount of the steering wheel SH is detected in step S14, and the turning angles of the front wheels 2L and 2R in accordance with the steering operation amount, the position of the imaginary kingpin axis, and the geometry information are calculated in subsequent step S15.

As a correlation between the steering operation amount and the turning angle, the turning angle is set to increase as the steering operation amount increases, and in step S15, the turning angle is calculated within a range in which the correlation is maintained. This correlation includes plural different corresponding cases, and each case corresponds to each setting position of the imaginary kingpin axes. For this reason, when the setting position of the imaginary kingpin axis changes, the degree of the increasing turning angle with respect to an increase in the steering operation amount changes before and after the change of the setting position of the imaginary kingpin axis.

Specifically, the steering operation amount and the turning angle obtaining the optimal steering feeling for each position of the imaginary kingpin axes are specified in advance through a computer simulation or a test, the correlation of the specified value is created as table data for each setting position of the imaginary kingpin axes, and then the group of table data is stored in a ROM of the controller 30. Then, the controller 30 reads the table data corresponding to the setting position of the imaginary kingpin axis read in step S12, and calculates the turning angle based on the table data, thereby realizing the correlation of the case different for each setting position of the imaginary kingpin axes.

As such, the reason why a different correlation is set to each setting position of the imaginary kingpin axes is as follows. That is, since the magnitude of the lateral force of the vehicle generated with respect to the same turning angle changes as the position of the imaginary kingpin axis changes, when the correlation between the steering operation amount and the turning angle is fixed to one case, a variation in the steering feeling increases before and after changing the setting position of the imaginary kingpin axis. Therefore, according to the embodiment, even when the position of the imaginary kingpin axis changes, since the variation in the steering feeling is suppressed, the stability of the steering feeling is improved.

The cases included in the correlation include a region where the turning angle increases in proportion to an increase in the steering operation amount. For this reason, in this region, the operation of the steering wheel SH and the movement of the vehicle naturally correspond to each other, thereby obtaining a satisfactory steering feeling. Further, in order to prevent a sudden movement generated upon starting the steering, the start region (the region close to the neutral position) of the steering wheel SH is non-linearly set so that the steering operation amount and the turning angle are not proportional, and the region is continuously connected to the above-described proportional region.

In step S16, the driving amount of each of the servomotors 21 to 23 is determined so as to obtain the turning angle calculated in step S15 at the setting position of the imaginary kingpin axis read in step S12, and the servo motors 21 to 23 are driven in accordance with the determined driving amount in step S17. Subsequently, the process is returned to step S11, and then the same procedures are repeated. The controller 30 serves as the turning angle control device according to the invention by performing the routine of FIG. 6. In addition, the driving amount of each servo motor is corrected so as to realize the calculated turning angle when the tread and the toe angle are changed from their initial values, thereby reflecting the changed setting values of the tread and the toe angle.

Figure 7:
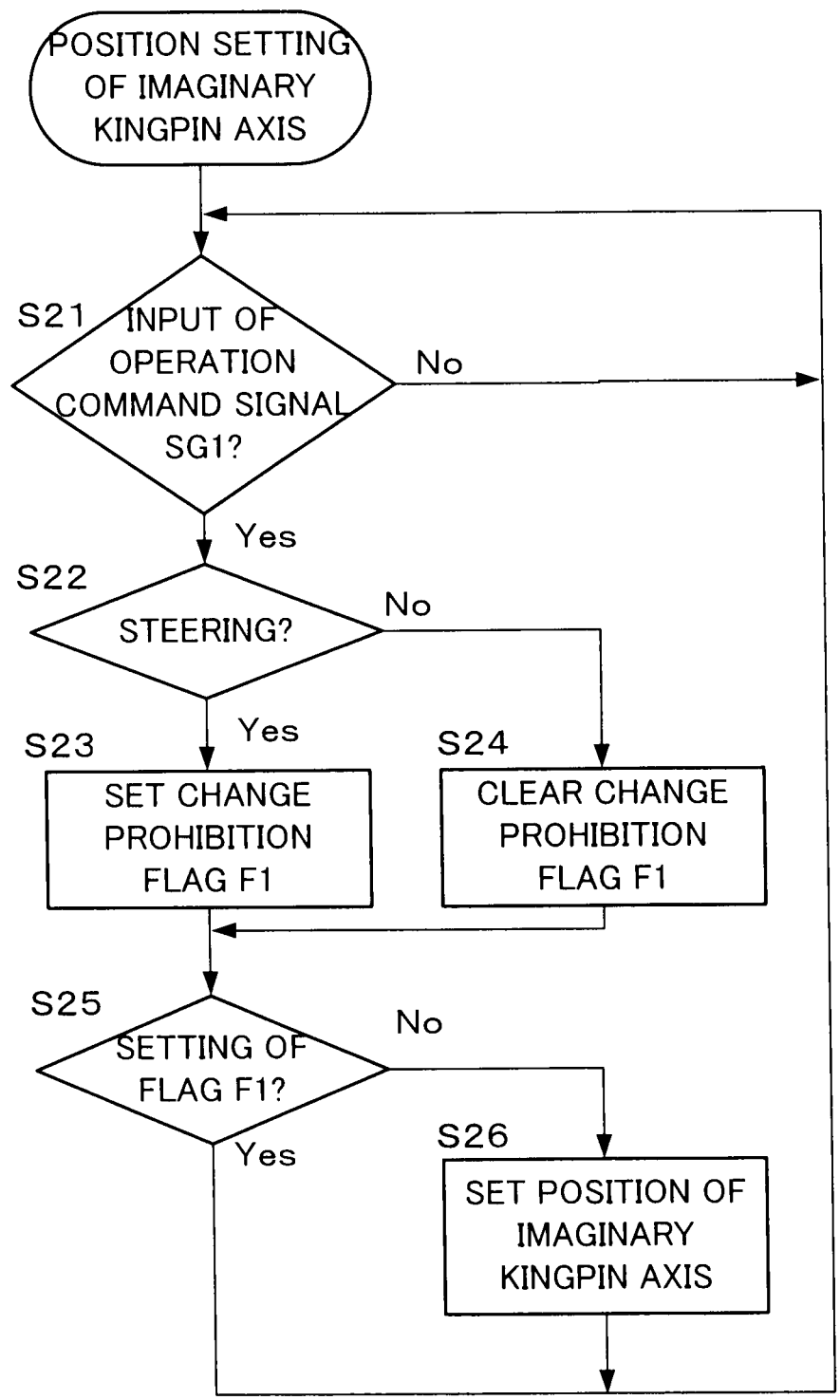
FIG. 7 is a flowchart illustrating an example of an imaginary kingpin axis position setting routine.

FIG. 7 is a flowchart illustrating an example of an imaginary kingpin axis position setting routine. In this routine, first in step S21, it is determined whether an operation command signal SG1 is input from the information input device 35. The process is put on hold when there is no input of the operation command signal SG1, and the process of subsequent step S22 is performed when there is an input. In step S22, it is determined whether the steering is performed with the given turning angle. This determination may be realized in accordance with whether the value is 0, that is, the steering wheel SH is at the neutral position based on the signal from the steering angle sensor 32. The process of step S23 is performed when the steering is performed, and the process of step S24 is performed when the steering is not performed.

In step S23, a change prohibition flag F1 provided to prohibit the setting change of the position of the imaginary kingpin axis is set. The change prohibition flag F1 is a variable allocated to a storage area such as a RAM of the controller 30, where the state of setting the flag F1 represents the setting change prohibition state, and the state of clearing the flag F1 represents the prohibition canceling state, that is, the setting change permission state. In step S24, the change prohibition flag F1 is cleared.

In subsequent step S25, it is determined whether the change prohibition flag F1 is set. When the change prohibition flag F1 is set, the process of step S21 is performed without changing the position of the imaginary kingpin axis. When the change prohibition flag F1 is not set, since the change prohibition is shifted to the change permission, the process of step S26 is performed, and the position of the imaginary kingpin axis is set to the position in accordance with the command contents of the operation command signal SG1. Further, in step S26, the position is set for both left and right front wheels as described above. Subsequently, the process is returned to step S21, and then the same procedures are repeated.

In this routine, the position changing of the imaginary kingpin axis in a steering state is prohibited by setting the change prohibition flag F1, and the prohibition is canceled in response to the return to the neutral position in the steering state. Then, the setting position is changed in step S26 along with the cancellation. Accordingly, the steering operation may be performed at the different positions of the imaginary kingpin axes between front and rear corners of a continuous corner such as an S-shaped corner having a flexion point. In such a continuous corner, even when a lateral acceleration remains upon clearing the front corner, the steering may be compulsorily performed in the opposite direction toward the rear corner. However, in this case, it is effective in that the setting position of the imaginary kingpin axis may be changed to the appropriate position in the rear corner. The controller 30 serves as the imaginary kingpin axis setting device according to the invention by performing the routine of FIG. 6 together with the routine of FIG. 7, and serves as the change prohibition device according to the invention by performing the routine of FIG. 7.

Figure 8:
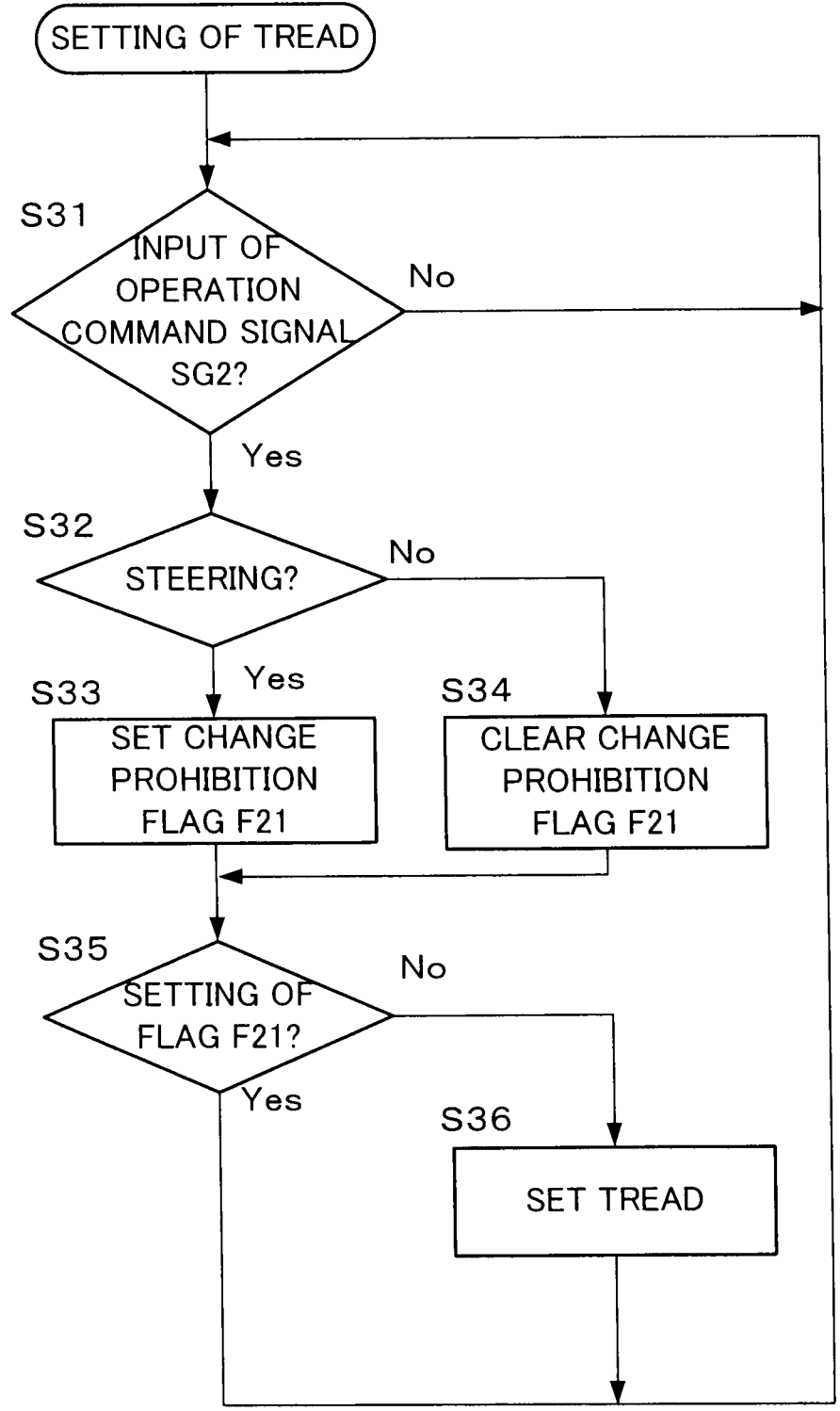
FIG. 8 is a flowchart illustrating an example of a tread setting routine.

FIG. 8 is a flowchart illustrating an example of a tread setting routine. The basic structure of this routine is the same as that of the routine of FIG. 7. That is, first in step S31, it is determined whether an operation command signal SG21 is input from the information input device 35. The process is put on hold when there is no input of the operation command signal SG21, and the process of subsequent step S32 is performed when there is an input. In step S32, it is determined whether the steering is performed with the given turning angle. The process of step S33 is performed when the steering is performed, and the process of step S34 is performed when the steering is not performed.

In step S33, a change prohibition flag F21 provided to prohibit the tread setting change is set. The change prohibition flag F21 is a variable allocated to a storage area such as a RAM of the controller 30, where the state of setting the flag F21 represents the setting change prohibition state, and the state of clearing the flag F21 represents the prohibition canceling state, that is, the setting change permission state. In step S34, the change prohibition flag F21 is cleared.

In subsequent step S35, it is determined whether the change prohibition flag F21 is set. When the change prohibition flag F21 is set, the process of step S31 is performed without changing the tread. When the change prohibition flag F21 is not set, since the setting change is permitted, the process of step S36 is performed, and the tread in accordance with the command contents of the operation command signal SG21 is set. Subsequently, the process is returned to step S31, and then the same procedures are repeated.

Figure 9:
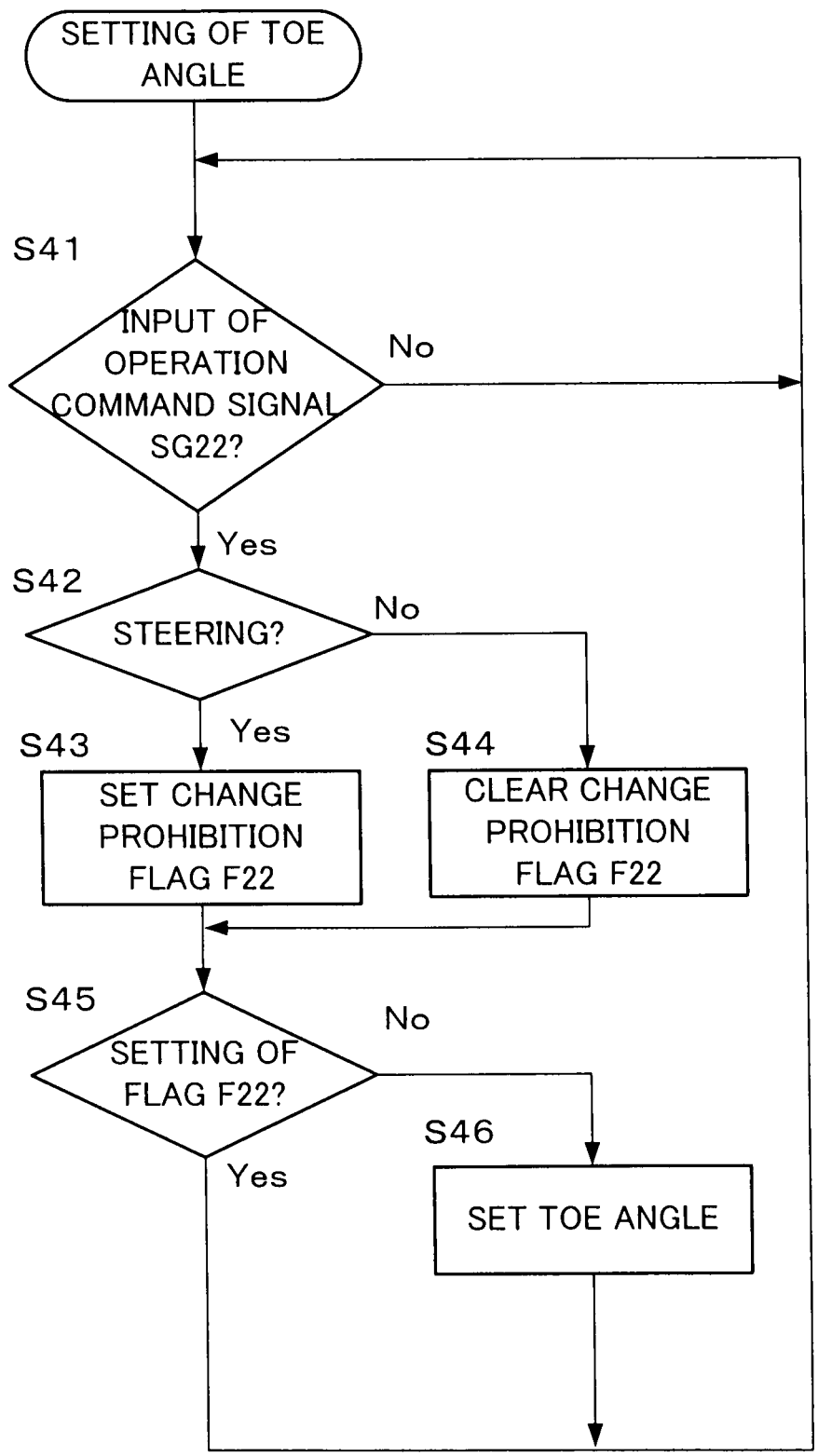
FIG. 9 is a flowchart illustrating an example of a toe angle setting routine.

FIG. 9 is a flowchart illustrating an example of a toe angle setting routine. The basic structure of this routine is the same as those of the routines of FIGS. 7 and 8. That is, first in step S41, it is determined whether an operation command signal SG22 is input from the information input device 35. The process is put on hold when there is no input of the operation command signal SG22, and the process of subsequent step S42 is performed when there is an input. In step S42, it is determined whether the steering is performed with the given turning angle. The process of step S43 is performed when the steering is performed, and the process of step S44 is performed when the steering is not performed.

In step S43, a change prohibition flag F22 provided to prohibit the toe angle setting change is set. The change prohibition flag F22 is a variable allocated to a storage area such as a RAM of the controller 30, where the state of setting the flag F22 represents the setting change prohibition state, and the state of clearing the flag F22 represents the prohibition canceling state, that is, the setting change permission state. In step S44, the change prohibition flag F22 is cleared.

In subsequent step S45, it is determined whether the change prohibition flag F22 is set. When the change prohibition flag F22 is set, the process of step S41 is performed without changing the toe angle. When the change prohibition flag F22 is not set, since the setting change is permitted, the process of step S46 is performed, and the tread in accordance with the command contents of the operation command signal SG22 is set. Subsequently, the process is returned to step S41, and then the same procedures are repeated.

According to the routines of FIGS. 8 and 9, the setting and changing of the geometry such as a tread and a toe angle are prohibited in a steering state. In other words, the setting and changing of the geometry is permitted at the neutral position where the vehicle moves forward. For this reason, unexpected movement of the vehicle caused by a change of the geometry in a steering state may be prevented. Since the controller 30 performs the routine of FIG. 6 as well as at least one of the routines of FIGS. 8 and 9, the controller serves as the geometry setting device according to the invention.

(Second Embodiment)

Next, a second embodiment of the invention will be described. The embodiment is characterized in that the prohibition of settings of the position of the imaginary kingpin axis, the tread, and the toe angle in a steering state of the first embodiment may be compulsorily canceled through a control. The basic physical configuration of the embodiment is the same as that of the first embodiment, and the basic control is the same as that of the first embodiment. Accordingly, in the description below, the description of the point similar to the first embodiment will not be repeated.

Figure 10:
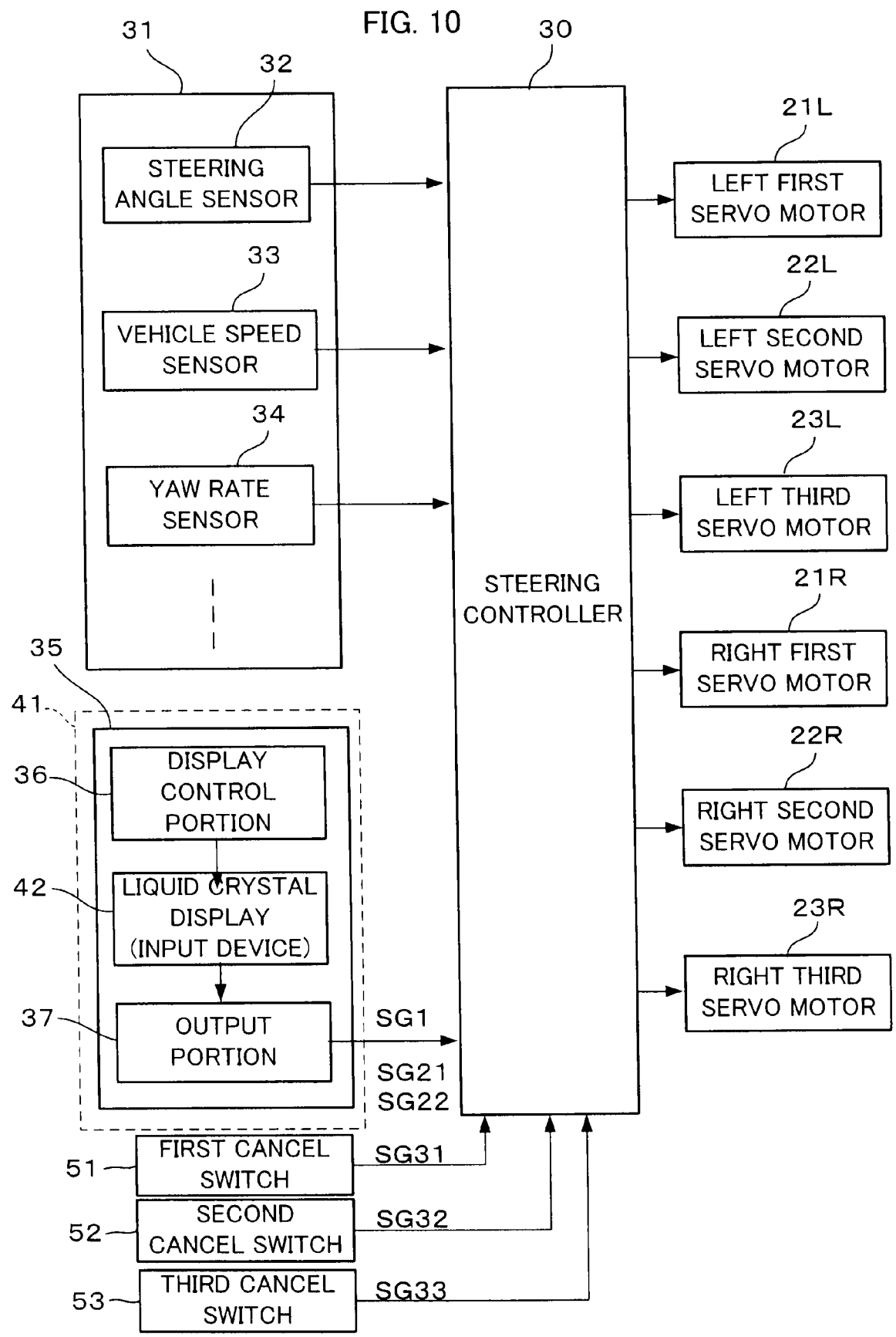
FIG. 10 is a block diagram illustrating a schematic configuration of a control system of a steering apparatus according to a second embodiment.

FIG. 10 is a block diagram illustrating a schematic configuration of the control system of the steering apparatus according to the second embodiment. As shown in the drawing, the steering apparatus of the embodiment includes cancel switches 51 to 53 which are operated to compulsorily cancel the setting change prohibition. The first cancel switch 51 is a switch which cancels the setting change prohibition of the position of the imaginary kingpin axis, the second cancel switch 52 is a switch which cancels the setting change prohibition of the tread, and the third cancel switch 53 is a switch which cancels the setting change prohibition of the toe angle. Each of the cancel switches 51 to 53 is of a push button type, and predetermined compulsory canceling signals SG31, SG32, and SG33 are input to the controller 30 in accordance with a push operation for each of the cancel switches 51 to 53. Each of the cancel switches 51 to 53 is attached to the steering wheel SH in order to improve the operability and the safety during a steering operation. Further, when the cancel switches 51 to 53 are assembled to the information input device 35, the switches maybe operated on the screen 42a of the liquid crystal display 42.

Figure 11:
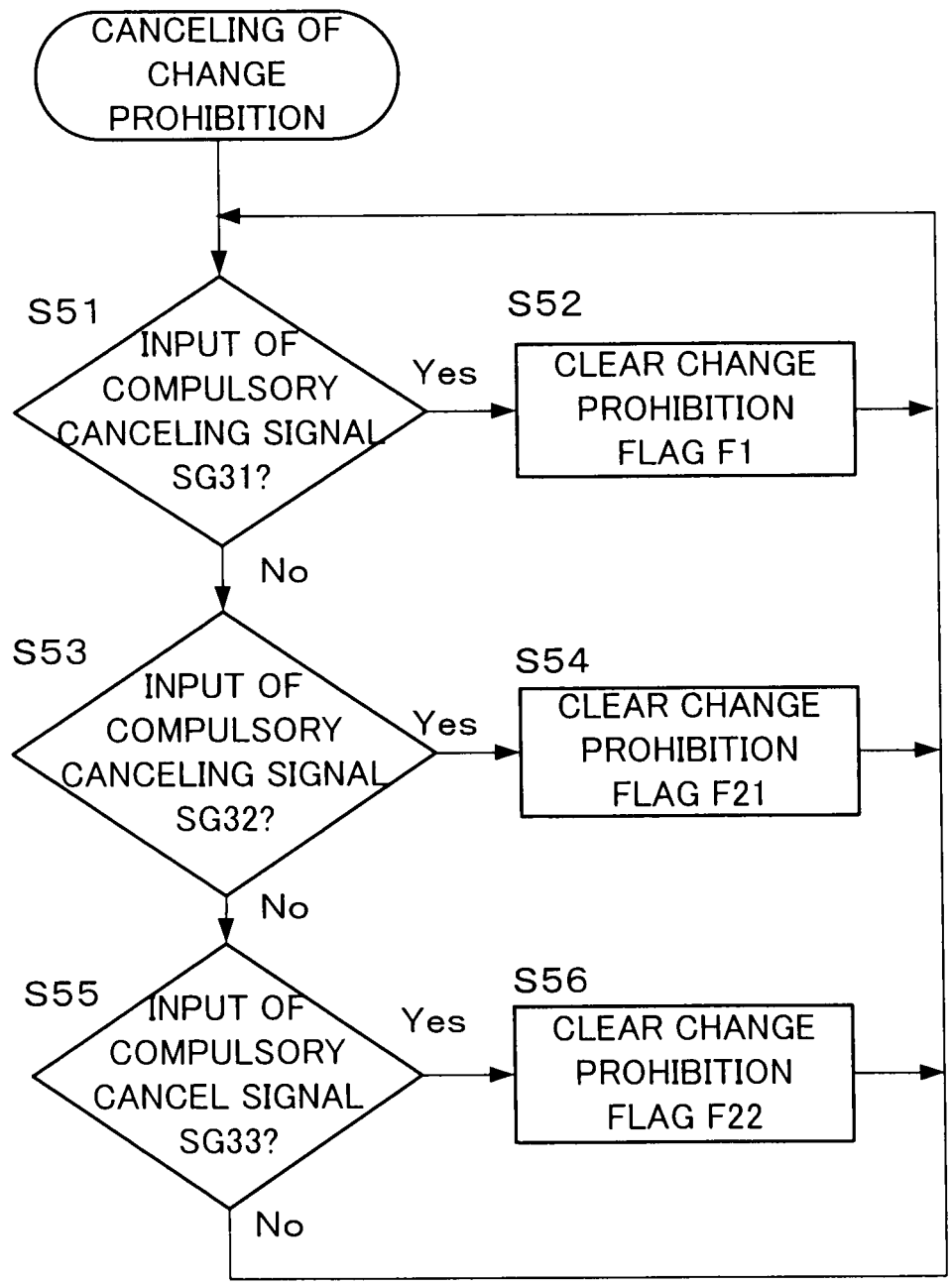
FIG. 11 is a flowchart illustrating an example of a change prohibition canceling routine according to the second embodiment.

FIG. 11 is a flowchart illustrating an example of a change prohibition canceling routine performed by the controller 30 in order to compulsorily cancel the position change prohibition of the imaginary kingpin axis. In this routine, first in step S51, it is determined whether the compulsory canceling signal SG31 is input. That is, it is determined whether the first cancel switch 51 for canceling the setting change prohibition of the position of the imaginary kingpin axis is pushed. When the compulsory canceling signal SG31 is input, the process of step S52 is performed. When the compulsory canceling signal SG31 is not input, the process of step S53 is performed.

In step S52, a change prohibition flag F1 of managing the change prohibition of the position of the imaginary kingpin axis is cleared. Accordingly, since the change of the position of the imaginary kingpin axis is permitted, a negative determination is made in step S25 of the routine of FIG. 7 even in the steering state, and hence the position of the imaginary kingpin axis is set in step S26. Further, as the position of the imaginary kingpin axis set at the time of the setting, the position stored in advance in the controller 30 is selected in accordance with the input timing of the compulsory canceling signal SG31, the position of the imaginary kingpin axis before a change, and a vehicle movement parameter such as a vehicle speed or a yaw rate.

Hereinafter, in the same way, when it is determined that the compulsory canceling signal SG32 is input in step S53, the process of step S54 is performed, and the change prohibition flag F21 is cleared. Accordingly, a negative determination is made in step S35 of FIG. 8, and the tread is set in step S36. Further, when it is determined that the compulsory canceling signal SG33 is input in step S55, the process of step S56 is performed, and the change prohibition flag F22 is cleared. Accordingly, a negative determination is made in step S45 of FIG. 9, and the toe angle is set in step S46.

As such, according to the routine, the position of the imaginary kingpin axis prohibited to be changed during the steering operation in principle may be exceptionally changed. The controller 30 serves as the compulsory canceling device according to the invention by performing the routine of FIG. 11. Generally, in a corner such as a spoon corner where the steering direction is the same and further turning or returning of the steering wheel is needed, the setting position of the imaginary kingpin axis may be changed at the time of further turning or returning the steering wheel or the movement of the vehicle maybe changed during the steering operation, which may be advantageous in the steering operation in some times. According to the embodiment, since such demands may be handled, the convenience of the steering apparatus may be improved. Further, in a continuous corner such as an S-shaped corner, the cornering performance may be improved by changing geometry such as a tread or a toe angle for each corner. For example, when the tread is changed during the steering operation so that the turning outer wheel is located on the outside, the rolling reduces, and hence the ground contact load of the vehicle wheel reduces. For this reason, the cornering speed may become faster compared with the case where the tread is uniformly maintained. According to the embodiment, since the geometry such as a tread or a toe angle may be changed during the steering operation, such cases may be appropriately handled.

Further, in the embodiment, as a condition of canceling the setting change prohibition, the cancel switches 51 to 53 may be operated, but the setting change prohibition may be canceled in a predetermined condition in addition to the operation of the operation members or instead of the operation. Further, when a predetermined condition is satisfied, a routine programmed to generate a signal corresponding to the above-described canceling signal may be performed by the controller 30 regardless of the user's intension so as to compulsorily cancel the setting change prohibition.

(Third Embodiment)

Next, a third embodiment of the invention will be described. The embodiment is characterized in that the control of the second embodiment is improved, and the control for securely performing various setting changes during the steering operation is performed. As in the second embodiment, even in the embodiment, the basic physical configuration is the same as that of the first embodiment, and the basic control is also the same as that of the first embodiment. Accordingly, in the description below, the description of the point similar to the first embodiment will be omitted. Further, since the control system according to the embodiment is the same as that of the second embodiment, FIG. 10 will be appropriately used for reference.

Figure 12:
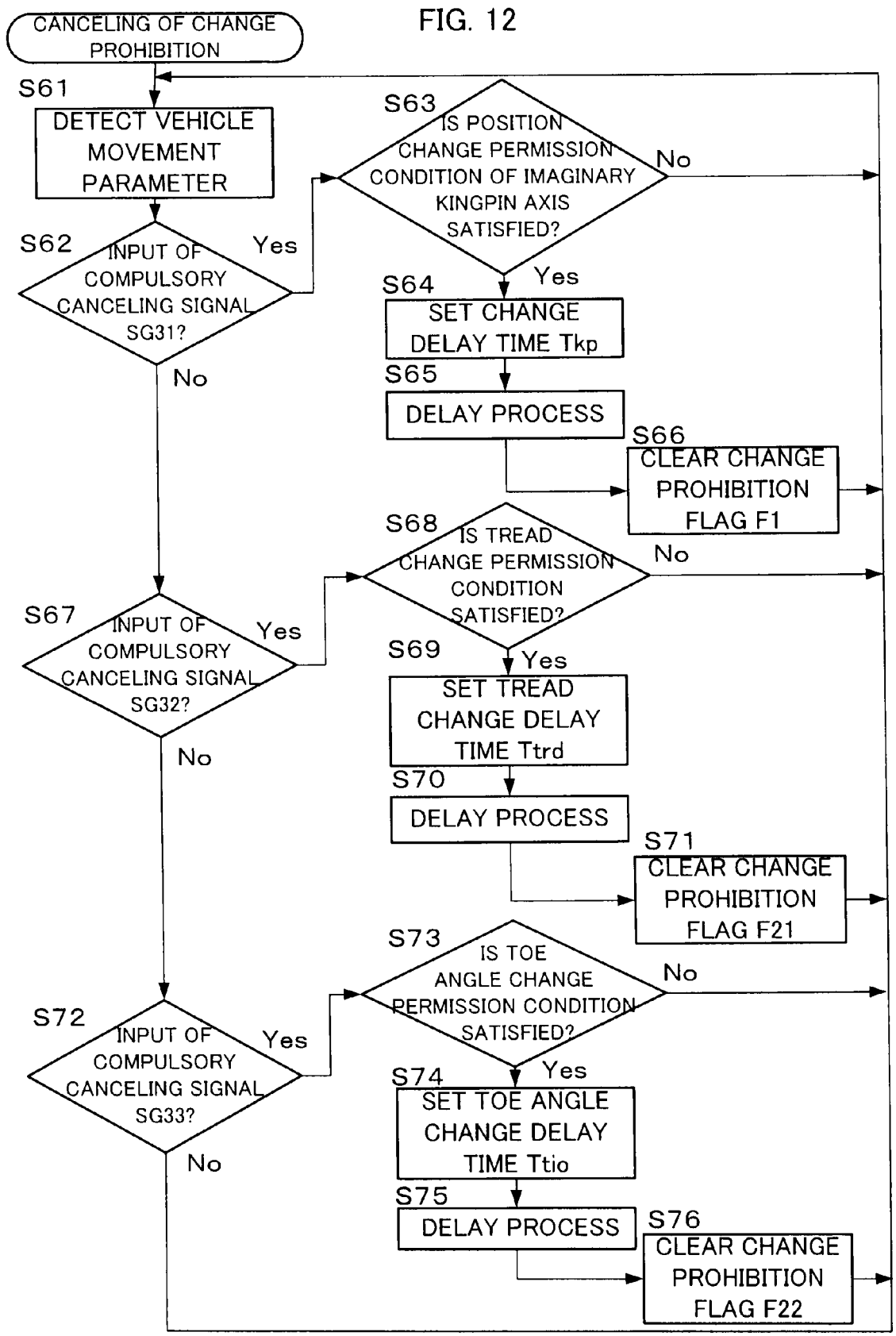
FIG. 12 is a flowchart illustrating an example of a change prohibition canceling routine according to a third embodiment.

FIG. 12 is a flowchart illustrating an example of a change prohibition canceling routine according to the third embodiment. In this routine, first in step S61, vehicle movement parameters are detected. Examples of the parameters detected herein include a vehicle speed V, a yaw rate Yr, an operation speed Sv of the steering wheel SH to be used in the following process. These parameters are detected based on the output signals from the sensors 32 to 34 of the state detecting device 31 shown in FIG. 10.

In subsequent step S62, it is determined whether the compulsory canceling signal SG31 is input. When the compulsory canceling signal SG31 is input, the process of step S63 is performed. When the compulsory canceling signal SG31 is not input, the process of step S67 is performed. In step S63, it is determined whether the condition of permitting the change of the position of the imaginary kingpin axis is satisfied. The permission condition is satisfied when the vehicle speed V and the yaw rate Yr satisfy the following condition. That is, the condition is that V<Kkpv and Yr<Kkpyr are simultaneously satisfied. Here, Kkpv indicates a reference speed of permitting the change of the position of the imaginary kingpin axis. The reference speed Kkpv corresponds to the upper limit value of the speed ensuring the same safety even when the position of the imaginary kingpin axis is changed during the steering operation. Further, Kkpyr indicates a reference yaw rate of permitting the change of the position of the imaginary kingpin axis. The reference yaw rate Kkpyr corresponds to the upper limit value of the yaw rate capable of ensuring the same safety even when the position of the imaginary kingpin axis is changed during the steering operation. When the position change permission condition is satisfied, the process of step S64 is performed. When the position change permission condition is not satisfied, the process returns to step S61 without canceling the position change prohibition of the imaginary kingpin axis.

In step S64, a change delay time Tkp for delaying the change of the position of the imaginary kingpin axis is set. The delay time Tkp is set by applying the operation speed Sv detected in step S61 to the following equation 1.

$$Tkp = A \cdot Sv \qquad 1$$

Here, A is a relaxation coefficient. As long as the relaxation coefficient A is a positive value, an integer or a variable may be used. As obviously understood from the equation 1, the delay time Tkp is set to become longer as the operation speed Sv of the steering wheel SH becomes faster.

In subsequent step S65, a delay process of delaying the process by the delay time Tkp set in step S64 is performed. Then, the change prohibition flag F1 is cleared in subsequent step S66. Accordingly, as in the second embodiment, a negative determination is made in step S25 of FIG. 7, and the position of the imaginary kingpin axis is set in step S26. As the setting at this time, the position stored in advance in the controller 30 in accordance with the input timing of the compulsory canceling signal SG31, the position of the imaginary kingpin axis before a change, and a vehicle movement parameter such as a vehicle speed or a yaw rate is selected as the setting position of the imaginary kingpin axis as in the second embodiment.

In step S67, it is determined whether the compulsory canceling signal SG32 is input. When the compulsory canceling signal SG32 is input, the process of step S68 is performed. When the compulsory canceling signal SG32 is not input, the process of step S72 is performed. In step S68, it is determined whether the condition of permitting the change of the tread is satisfied. The permission condition is satisfied when the vehicle speed V and the yaw rate Yr satisfy the following condition. That is, the condition is that V<Ktrdv and Yr<Ktrdyr are simultaneously satisfied. Here, Ktrdv indicates a reference speed of permitting the change of the tread. The reference speed Ktrdv corresponds to the upper limit value of the speed ensuring the same safety even when the tread is changed during the steering operation. Further, Ktrdyr indicates a reference yaw rate of permitting the change of the tread. The reference yaw rate Ktrdyr corresponds to the upper limit value of the yaw rate capable of ensuring the same safety even when the tread is changed during the steering operation. When the tread change permission condition is satisfied, the process of step S69 is performed. When the tread change permission condition is not satisfied, the process returns to step S61 without canceling the tread change prohibition.

In step S69, a change delay time Ttrd for delaying the change of the tread is set. The delay time Ttrd is set by applying the operation speed Sv detected in step S61 to the following equation 2.

$$Ttrd = B \cdot Sv \qquad 2$$

Here, B is a relaxation coefficient. As long as the relaxation coefficient B is a positive value, an integer or a variable may be used. As obviously understood from the equation 2, the delay time Ttrd is set to become longer as the operation speed Sv of the steering wheel SH becomes faster.

In subsequent step S70, a delay process of delaying the process by the delay time Ttrd set in step S69 is performed. Then, the change prohibition flag F21 is cleared in subsequent step S71. Accordingly, a negative determination is made in step S35 of FIG. 8, and the position of the imaginary kingpin axis is set in step S36.

In step S72, it is determined whether the compulsory canceling signal SG33 is input. When the compulsory canceling signal SG33 is input, the process of step S73 is performed. When the compulsory canceling signal SG333 is not input, the process returns to step S61. In step S73, it is determined whether the condition of permitting the change of the toe angle is satisfied. The permission condition is satisfied when the vehicle speed V and the yaw rate Yr satisfy the following condition. That is, the condition is that V<Ktiov and Yr<Ktioyr are simultaneously satisfied. Here, Ktiov indicates a reference speed of permitting the change of the toe angle. The reference speed Ktiov corresponds to the upper limit value of the speed ensuring the same safety even when the toe angle is changed during the steering operation. Further, Ktioyr indicates a reference yaw rate of permitting the change of the toe angle. The reference yaw rate Ktioyr corresponds to the upper limit value of the yaw rate capable of ensuring the same safety even when the toe angle is changed during the steering operation. When the toe angle change permission condition is satisfied, the process of step S74 is performed. When the toe angle change permission condition is not satisfied, the process returns to step S61 without canceling the toe angle change prohibition.

In step S74, a change delay time Ttio for delaying the change of the toe angle is set. The delay time Ttio is set by applying the operation speed Sv detected in step S61 to the following equation 3.

$$Ttio = C \cdot Sv \qquad 3$$

Here, C is a relaxation coefficient. As long as the relaxation coefficient C is a positive value, an integer or a variable may be used. As obviously understood from the equation 3, the delay time Ttio is set to become longer as the operation speed Sv of the steering wheel SH becomes faster.

In subsequent step S75, a delay process of delaying the process by the delay time Ttio set in step S74 is performed. Then, the change prohibition flag F22 is cleared in subsequent step S76. Accordingly, a negative determination is made in step S45 of FIG. 9, and the toe angle is set in step S46.

According to the above-described routine, since the setting change prohibition is compulsorily canceled only when the change permission condition is satisfied in step S63, step S68, and step S73 even when the compulsory canceling signals SG31 to SG33 are input, the same safety may be ensured at the time of changing the setting during the steering operation. In addition, even when the compulsory canceling signals SG31 to SG33 are input, the change prohibition is not immediately canceled and the canceling thereof is delayed by the delay processes of step S65, step S70, and step S75. Since the delay time becomes longer as the operation speed of the steering wheel SH becomes faster, a change of the movement of the vehicle may be alleviated when changing the setting position of the imaginary kingpin axis and the like during the steering operation, and hence the safety is improved. The controller 30 serves as the change delay time setting device according to the invention by performing the routine of FIG. 12.

Figure 13:
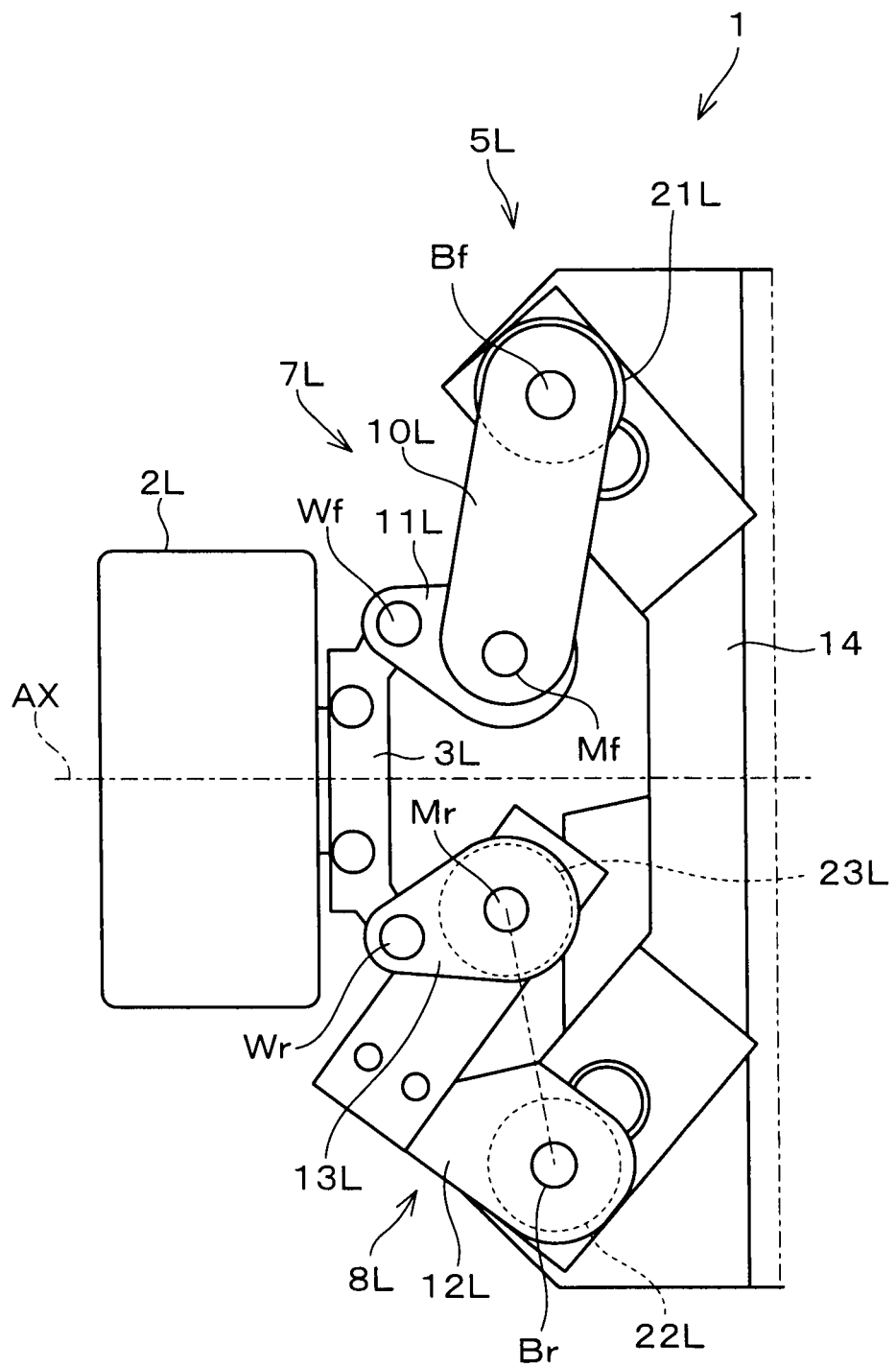
FIG. 13 is a diagram illustrating a detailed example of the steering apparatus of FIG. 1.

In the above-described embodiments, all the links 10 to 13 are depicted to be linear, but the actual shapes of the links 10 to 13 are not limited to the simple shape. FIG. 13 illustrates an example more specifically showing the steering apparatus 1 of FIG. 1. Further, in FIG. 13, only the left arm mechanism 5L is shown, and the right arm mechanism 5R is symmetrically formed. In the example of FIG. 13, the link 12L of the rear arm 8L is formed as an L-shaped member. In this case, the line connecting the vehicle body side connection point Br and the middle connection point Mr corresponds to the link 12L of FIG. 1.

Figure 14:
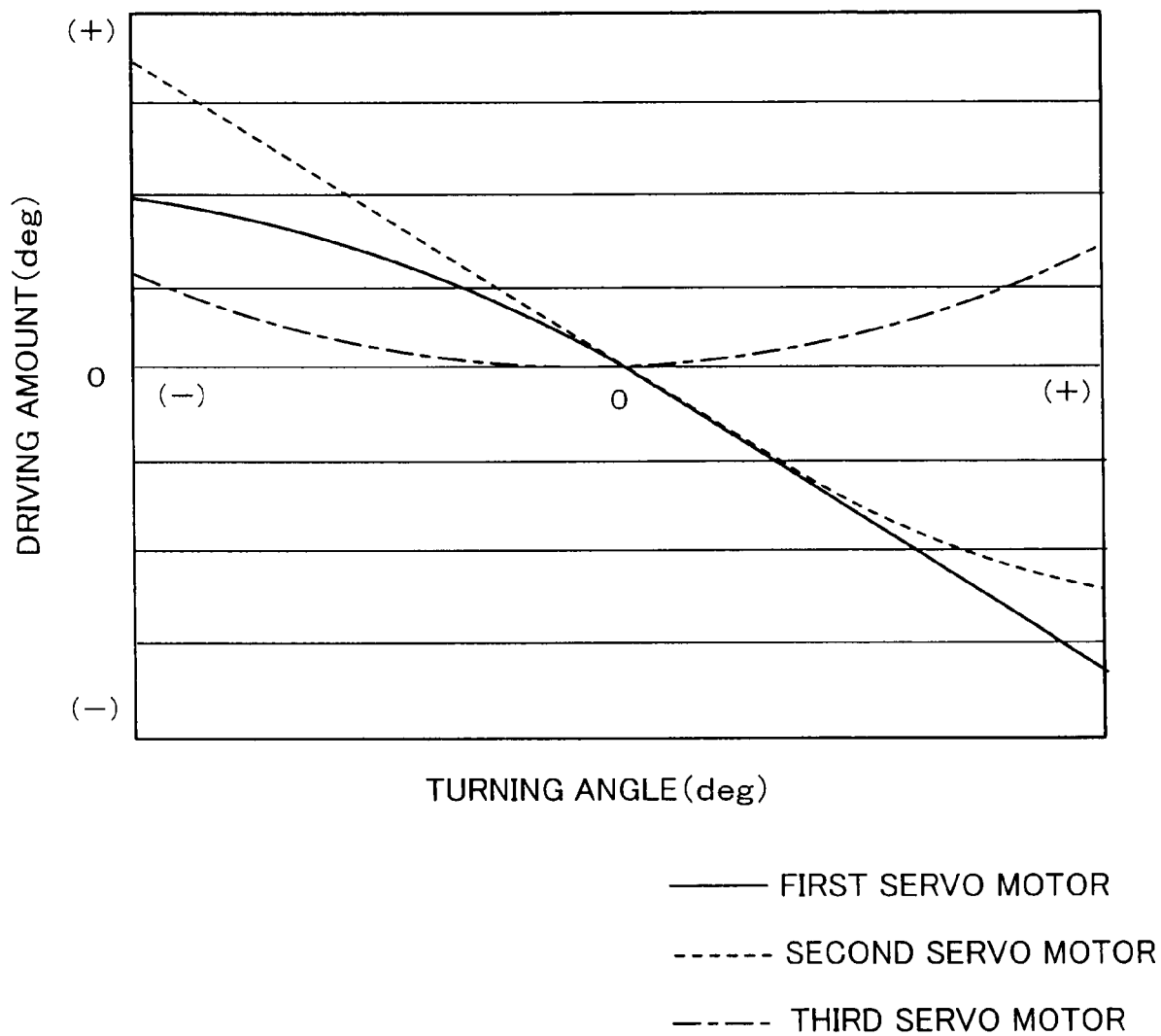
FIG. 14 is a diagram illustrating a correlation between a turning angle and a driving amount of each servo motor when the position of the imaginary kingpin axis is set to the center of the ground contact surface of the front wheel.
Figure 15:
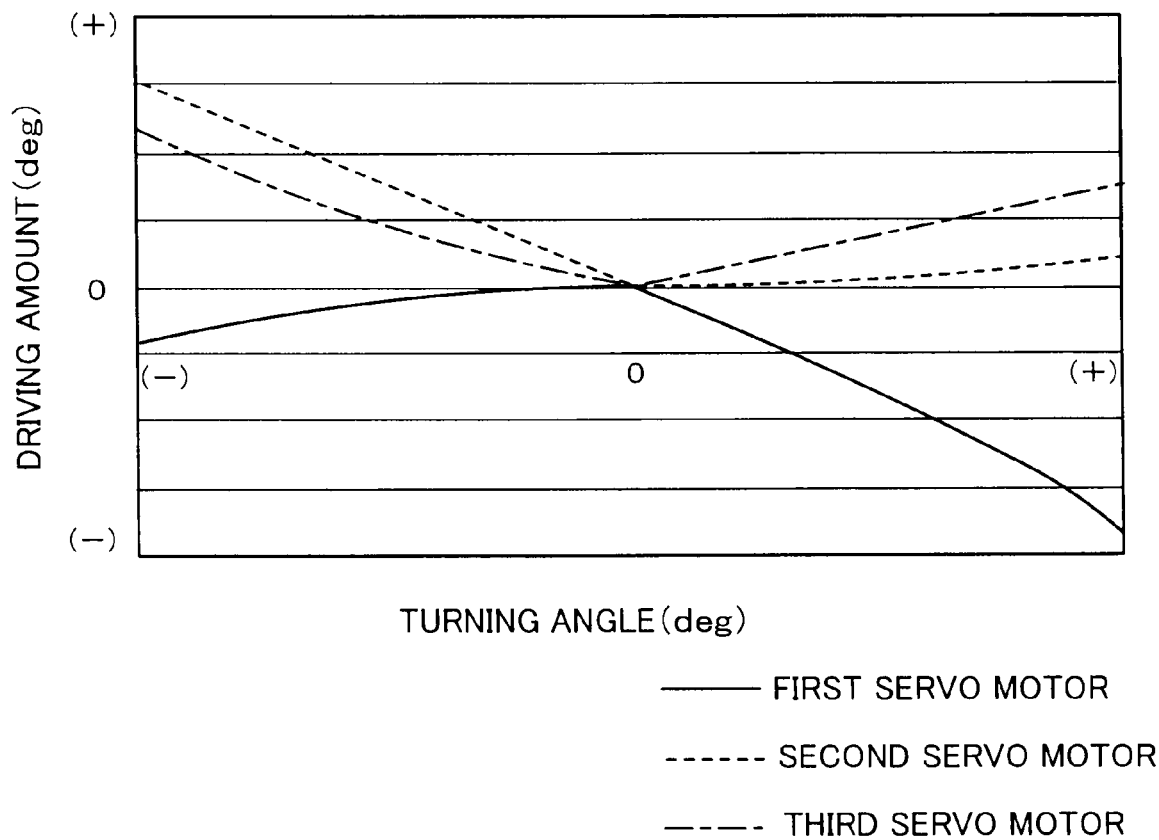
FIG. 15 is a diagram illustrating a correlation between the turning angle and the driving amount of each servo motor when the position of the imaginary kingpin axis is set to the front and rear ends of the front wheel.

Further, the driving amounts (the operation angles) of the servo motors 21 to 23 for realizing the required turning angles change in accordance with the shapes and the dimensions of the links 10 to 13. FIGS. 14 and 15 are diagrams showing a correlation between the turning angles and the driving amounts of the servo motors 21L to 23L in the example of FIG. 13. FIG. 14 illustrates a case where the position of the imaginary kingpin axis is set to the center of the ground contact surface of the front wheel 2L, and FIG. 15 illustrates a case where the position of the imaginary kingpin axis is set to the front and rear ends of the front wheel 2L. Further, the fact that the position of the imaginary kingpin axis is set to the front and rear ends of the front wheel 2L indicates that the position of the imaginary kingpin axis is set to the front end of the front wheel 2L when making a right turn and the position of the imaginary kingpin axis is set to the rear end of the front wheel 2L when making a left turn in the opposite direction (refer to FIG. 2). In the drawings, the solid line indicates the driving amount of the first servo motor 21L, the dashed line indicates the driving amount of the second servo motor 22L, and the one-dotted dashed line indicates the driving amount of the third servo motor 23L. Further, in the driving amount of each of the servo motors 21L to 23L, the clockwise rotation is set to a positive value, and in the turning angle, the right direction is set to a positive value. As obviously understood from the drawings, the driving amounts of the servo motors 21L to 23L realizing the same turning angle by the position of the imaginary kingpin axis are different. Further, it is found that the servo motors 21L to 23L are non-linearly operated upon changing the turning angle regardless of the position of the imaginary kingpin axis. When the position of the imaginary kingpin axis is set to the front and rear ends of the front wheel 2L, the setting position thereof changes when making a right turn and a left turn. For this reason, the servo motors 21L to 23L change in accordance with the cusp using the neutral position of the turning angle of 0 as the boundary.

The invention is not limited to the above-described embodiments, and may be embodied in various forms. For example, as the positions of the servo motors 21 to 23, the servo motors 21 to 23 may be respectively disposed at the vehicle wheel side connection points Wf and Wr and another connection point so as to be attached to three connection points among six connection points. Each of the front arm 7 and the rear arm 8 may have a configuration in which three or more links are rotatably connected to each other at the middle connection point thereof. Even when the number of the links increases, if the link angle about the connection point provided as many as number obtained by subtracting three from the total numbers of the connection points is determined by the link driving device, the link angles about the other three connection points are simultaneously set.

However, the link driving device may be disposed in at least one of the other three connection points, and the operation of each link driving device may be controlled so that inconsistency does not occur between the link driving devices of other connection points. For example, the link driving devices are disposed at the connections points as many as the total number of the vehicle body side connection points Bf and Br, the middle connection points Mf and Mr, and the vehicle wheel side connection points Wf and Wr, and the links are rotationally driven about the connection points corresponding to the link driving devices, thereby determining the link angles. The link driving device is not limited to the example of using the servo motor. When the link may be rotationally driven about the connection point thereof and the angle thereof may be obtained, various actuators and driving mechanisms may be appropriately used. Further, a link driving device may be provided in which a rotation movement of any one of servo motors is transmitted to other connection points via a movement transmission mechanism such as a gear mechanism, and the angle of the link rotating about the connection point changes. Furthermore, at least one of the links may be configured as a direct-acting actuator movable in a telescopic manner.

Plural pairs of steering apparatuss of the invention may be provided in the vertical direction of the vehicle, and the arm mechanism of each pair may be independently driven. In this case, since the positions of the vehicle wheel side connection points Wf and Wr of each pair may be independently set, a camber angle, a caster angle, and a toe angle may be changed by three-dimensionally operating the imaginary kingpin axis. In this case, in each of the connection points, the links need to be connected to each other via a spherical bearing, a bush, or the like so as to be relatively rotatable about the connection point in the three-dimensional direction.

The invention claimed is:

1. A vehicle steering apparatus comprising:
   left and right arm mechanisms that connect a vehicle body to a vehicle wheel attachment portion attached with a vehicle wheel via front and rear arms disposed in a front-rear direction of a vehicle and having plural links rotatably connected to each other;
   an arm driving device that independently drives the left and right arm mechanisms so that each link angle corresponding to a turning angle of the vehicle wheel is determined; and
   a controller configured to
      change a setting position of an imaginary kingpin axis as a center of the turning angle, and
      control the arm driving device so that the turning angle corresponding to a steering operation amount of a steering member is obtained at the setting position of the imaginary kingpin axis,
   wherein the controller controls the arm driving device so that each link angle changes within a range of maintaining a correlation in which the turning angle increases in accordance with an increase in the steering operation amount, and
   wherein a different correlation is set to each setting position so that a degree of an increase in the turning angle with respect to an increase in the steering operation amount changes before and after changing the setting position of the imaginary kingpin axis.

2. The vehicle steering apparatus according to claim 1, further comprising:
   a change command device that commands the controller to change the setting position of the imaginary kingpin axis; and
   a change prohibition device that prohibits the change of the setting position by the controller when a command is sent from the change command device during a steering operation at the given turning angle.

3. The vehicle steering apparatus according to claim 2, wherein the change prohibition device cancels the setting position change prohibition with respect to the controller when returning from the steering operation to a neutral position of the steering member moving the vehicle forward.

4. The vehicle steering apparatus according to claim 2, further comprising:
   a compulsory canceling device that compulsorily cancels the setting position change prohibition by the change prohibition device during the steering operation.

5. The vehicle steering apparatus according to claim 1, further comprising:
   a change delay time setting device that sets a delay time, delaying the change of the setting position of the imaginary kingpin axis, to become longer as an operation speed of the steering member becomes faster during the steering operation at the given turning angle.

6. The vehicle steering apparatus according to claim 1, further comprising:
   a geometry setting device that is capable of changing at least one of a tread and a toe angle by changing each link angle; and
   a change delay time setting device that sets a delay time, delaying the change of the tread and the toe angle of the geometry setting device, to become longer as an operation speed of the steering member becomes faster during the steering operation at the given turning angle.

7. The vehicle steering apparatus according to claim 1, further comprising:
   a display device that is provided to be visible to a user of the vehicle and visually displays thereon plural positions that may be set as the setting position of the imaginary kingpin axis;
   a display control device that movably displays an indication device, selectively indicating any one of the plural positions, on the display device;
   an input device that receives a user's predetermined operation correlating an indication position of the indication device with any one of the plural positions; and
   a setting control device that makes the imaginary kingpin axis setting device set a position corresponding to the predetermined operation as the setting position of the imaginary kingpin axis when the input device receives the predetermined operation.

8. The vehicle steering apparatus according to claim 7, wherein a position of any one of left and right vehicle wheels is displayed as the plural positions on the display device, and
   the setting control device makes the imaginary kingpin axis setting device set the position corresponding to the predetermined operation as the setting position of the imaginary kingpin axis for each of the left and right vehicle wheels when the input device receives the predetermined operation.

9. The vehicle steering apparatus according to claim 1, wherein, in the front and rear arms, respective one end portions are rotatably connected to the vehicle wheel attachment portion at a pair of vehicle wheel side connection points distant from each other in the front-rear direction of the vehicle, and the respective other end portions are rotatably connected to the vehicle body at a pair of vehicle body side connection points distant from each other in the front-rear direction, and
   the plural links are rotatably connected to each other at a middle connection point.

10. The vehicle steering apparatus according to claim 9, wherein the arm driving device includes link driving devices attached to connection points provided as many as the number obtained by subtracting three from a total number of the vehicle body side connection point, the middle connection point, and the vehicle wheel side connection point in each arm mechanism, and each link driving device determines the link angle by rotationally driving the link about the corresponding connection point.

11. A setting apparatus that is applied to a vehicle steering apparatus capable of changing a setting position of an imaginary kingpin axis as a center of a turning angle of a vehicle wheel, the setting apparatus comprising:
a display device that visually displays plural positions that may be set as the setting position of the imaginary kingpin axis;
a display control device that movably displays an indication device, selectively indicating any one of the plural positions, on the display device;
an input device that receives a user's predetermined operation correlating an indication position of the indication device with any one of the plural positions; and
a setting control device that outputs a setting command signal for making the steering apparatus set a position corresponding to the predetermined operation as the setting position of the imaginary kingpin axis when the input device receives the predetermined operation.

12. The setting apparatus according to claim 11,
wherein a position of any one of left and right vehicle wheels is displayed as the plural positions on the display device, and
the setting control device outputs a signal as the setting command signal for making the steering apparatus set the position corresponding to the predetermined operation as the setting position of the imaginary kingpin axis for each of the left and right vehicle wheels when the input device receives the predetermined operation.

13. A vehicle steering apparatus comprising:
left and right arm mechanisms that connect a vehicle body to a vehicle wheel attachment portion attached with a vehicle wheel via front and rear arms disposed in a front-rear direction of a vehicle and having plural links rotatably connected to each other;
an arm driving device that independently drives the left and right arm mechanisms so that each link angle corresponding to a turning angle of the vehicle wheel is determined;
means for changing a setting position of an imaginary kingpin axis as a center of the turning angle; and
means for controlling the arm driving device so that the turning angle corresponding to a steering operation amount of a steering member is obtained at the setting position of the imaginary kingpin axis,
wherein the means for controlling controls the arm driving device so that each link angle changes within a range of maintaining a correlation in which the turning angle increases in accordance with an increase in the steering operation amount, and
wherein a different correlation is set to each setting position so that a degree of an increase in the turning angle with respect to an increase in the steering operation amount changes before and after changing the setting position of the imaginary kingpin axis.

\* \* \* \* \*